(12) United States Patent
Tandrow et al.

(10) Patent No.: US 8,729,837 B2
(45) Date of Patent: May 20, 2014

(54) AUTOMATIC DOOR WITH POSITION-DEPENDENT FORCE LIMITING

(75) Inventors: William F. Tandrow, Simi Valley, CA (US); Kurt P. Zierhut, Camarillo, CA (US); Michael A. Teitel, Ventura, CA (US); Symon Man-Yiu Tsui, Thousand Oaks, CA (US); Michael Fechtner, Fillmore, CA (US)

(73) Assignee: Haas Automation, Inc., Oxnard, CA (US)

( * ) Notice: Subject to any disclaimer, the term of this patent is extended or adjusted under 35 U.S.C. 154(b) by 616 days.

(21) Appl. No.: 12/554,828

(22) Filed: Sep. 4, 2009

(65) Prior Publication Data

US 2011/0060466 A1    Mar. 10, 2011

(51) Int. Cl.
*E05F 15/10*    (2006.01)
*G05D 3/12*    (2006.01)
*G05D 15/01*    (2006.01)

(52) U.S. Cl.
USPC ............ 318/268; 318/271; 318/272; 318/286

(58) Field of Classification Search
USPC ......... 318/162–164, 255–257, 264–266, 272, 318/282, 286, 430–434, 466–469, 268, 318/271; 388/904
See application file for complete search history.

(56) References Cited

U.S. PATENT DOCUMENTS

| | | | | |
|---|---|---|---|---|
| 4,145,641 | A * | 3/1979 | Ozaki | 318/269 |
| 4,300,661 | A * | 11/1981 | Hmelovsky | 187/316 |
| 5,373,120 | A * | 12/1994 | Barrett et al. | 187/316 |
| 5,378,861 | A * | 1/1995 | Barten et al. | 187/316 |
| 5,804,941 | A * | 9/1998 | Ray | 318/569 |
| 5,952,805 | A * | 9/1999 | Heaton | 318/561 |
| 6,445,152 | B1 * | 9/2002 | Calamatas | 318/445 |
| 7,034,486 | B1 * | 4/2006 | McMahon | 318/466 |
| 7,418,800 | B1 | 9/2008 | Sellman | |

* cited by examiner

*Primary Examiner* — Bentsu Ro
(74) *Attorney, Agent, or Firm* — McDermott Will & Emery LLP

(57) ABSTRACT

A method of controlling the motion of a moveable door includes determining the direction that the door is moving with respect to its anticipated closed position, and based on the direction, regulating an amount of force that is available to the door for its motion. The method may further include monitoring the position of the door as it is moving, and adjusting the motion of the door and regulating the amount of force available to the door for its motion, based on the calculated difference between the door's position as detected during monitoring and its expected position.

32 Claims, 23 Drawing Sheets

AUTOMATIC DOOR WITH POSITION-DEPENDENT FORCE LIMITING

BACKGROUND

A Computer Numerical Control machine ("CNC machine") is a type of computerized workshop device that can replace more conventional workshop machines. CNC machines are able to perform many common shop jobs such as drilling, milling and turning—and they can do it all automatically, creating any shape a machine operator defines.

CNC machines are computer programmed to perform all the tasks a human would have had to do on a manual machine, as well as many tasks that humans simply aren't able to do. Whether it's cutting a complicated curve into a heavy steel plate, or shaping a resin block into a three-dimensional prototype with laser cutting or milling, CNC machines can do it faster and with greater accuracy than other types of machines.

In modern CNC machine systems, an end-to-end component design is highly automated using sophisticated software programs, such as Computer Aided Drawing ("CAD") programs. The programs produce a computer file that is interpreted to extract the commands needed to operate a particular machine (e.g. whichever commands are appropriate for the tools inside that machine), and then loaded into the CNC machine for production. The workpiece, for example the heavy steel plate or resin block mentioned above, is placed in the machine, in a large compartment behind a closed door, where the various tools inside the machine can work on it to create the desired part. The complex series of steps needed to produce any part is highly automated, and produces a part that closely matches the original CAD design.

As with many workshop devices, CNC machines can have various safety features. Because of the kinds of tools involved, the speed at which they can operate inside the CNC machine, the automatic nature of the CNC machine, and the CNC machine's sheer size, these machines can inherently possess a number of safety hazards.

SUMMARY

A method of controlling the motion of a moveable door may include determining the direction that the door is moving with respect to a closed position of the door, and regulating an amount of force that is available to the door for its motion, based on the determined direction.

An automatic door with position-dependent torque limiting may include a door, a force generating element, a position sensing device, and a control system. The door may be configured to have a fully opened position and a closed position. The force generating element may be connected to the door such that force generated by the force generating element is applied to the door to move the door toward its fully opened position or closed position. The position sensing device may be configured to detect a current position of the door, and further configured to generate an output based on the detected current position of the door. The control system may be operatively connected to the force generating element, and configured to set acceleration of the door, and to regulate the amount of force generated by the force generating element, based upon the generated output from the position sensing device.

A control system for controlling the motion of a moveable door may include a direction detector, a position detector and a control unit. The direction detector may detect a direction that the door is moving, and a position detector may monitor the door as it is moving, and detect the door's current position at multiple points during its movement. The control unit may control a force generating element based on signals it receives from the direction and position detectors. Specifically, the control unit may be configured to receive a signal from the direction detector indicating which direction the door is moving with respect to a closed position of the door, and, based on the indicated direction, regulate an amount of force generated by the force generating element.

A computer-readable medium may contain computer-executable instructions for performing a method of controlling the motion of a moveable door. The instructions may cause the method to be performed including determining the direction that the door is moving with respect to a closed position of the door, and, based on the determined direction, regulating an amount of force that is available to the door for its motion.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. Moreover, the detailed description includes specific reference to a CNC machine for the purpose of providing a useful context in which to describe and understand the broader teachings of the subject technology. However, it will be apparent to those skilled in the art that the subject technology may be practiced with any type of actuating or moveable door, and is not limited to CNC machines. In some instances, well-known structures and components are shown in block diagram form in order to avoid obscuring the concepts of the subject technology.

Figure 1:
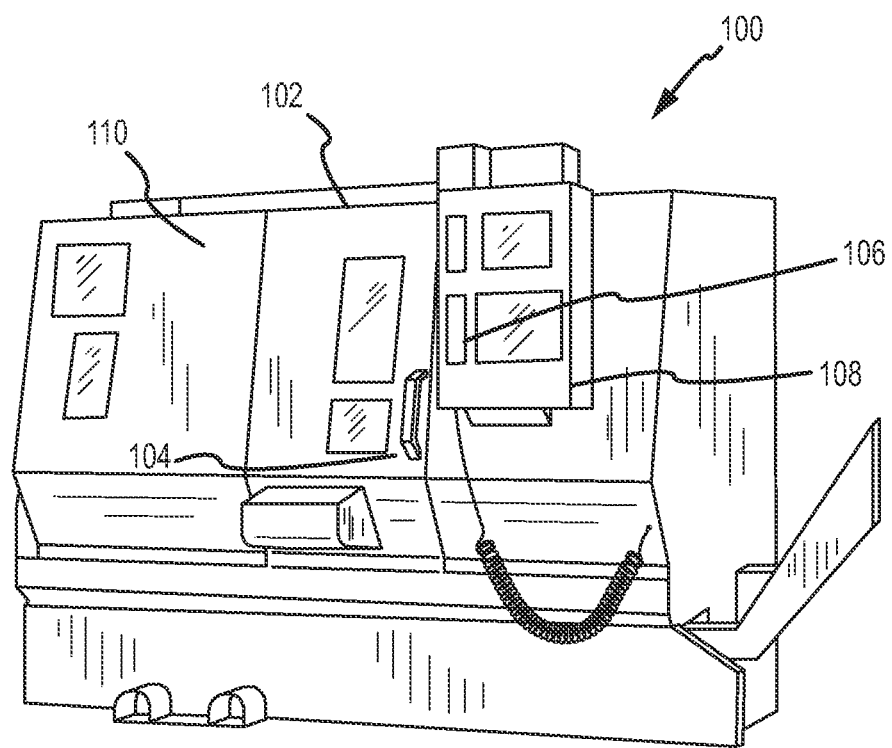
FIG. 1 illustrates an exemplary CNC machine.

FIG. 1 illustrates an exemplary CNC machine 100. A door 102 may conceal an inner compartment, where a workpiece may be placed. Once inside the compartment, tools inside the CNC machine 100 may be able to access and configure the workpiece. The door 102 may include a handle 104 by which the door can be moved. Alternatively, the door may be moved by pressing a button 106 on a control panel 108 or other locations on the CNC machine 100. If an operator presses the button 106, the button may, for example, send a signal to a control system indicating that the door should begin to open or begin to close, depending on the operator's desired task. For example, if the CNC machine operator wants to place a new workpiece in the CNC machine 100, and the door 102 is closed, he may press the button 106 which may indicate to a control system that the door 102 should begin to open. The inner compartment may then be revealed, such that the operator can place his workpiece inside the CNC machine 100. Then, the operator may press the button 106 again, while the door is still open, which may indicate to a control system that the door 102 should begin to close. In any event, the door 102 may protrude slightly from the body 110 of the CNC machine 100, so that the door 102 may slide back and forth along the body 110 of the CNC machine, to open and close. Of course, other door configurations are contemplated by the subject technology, including doors that swing back and forth, raise and lower or rotate about an axis, to name a few.

Figure 2A:
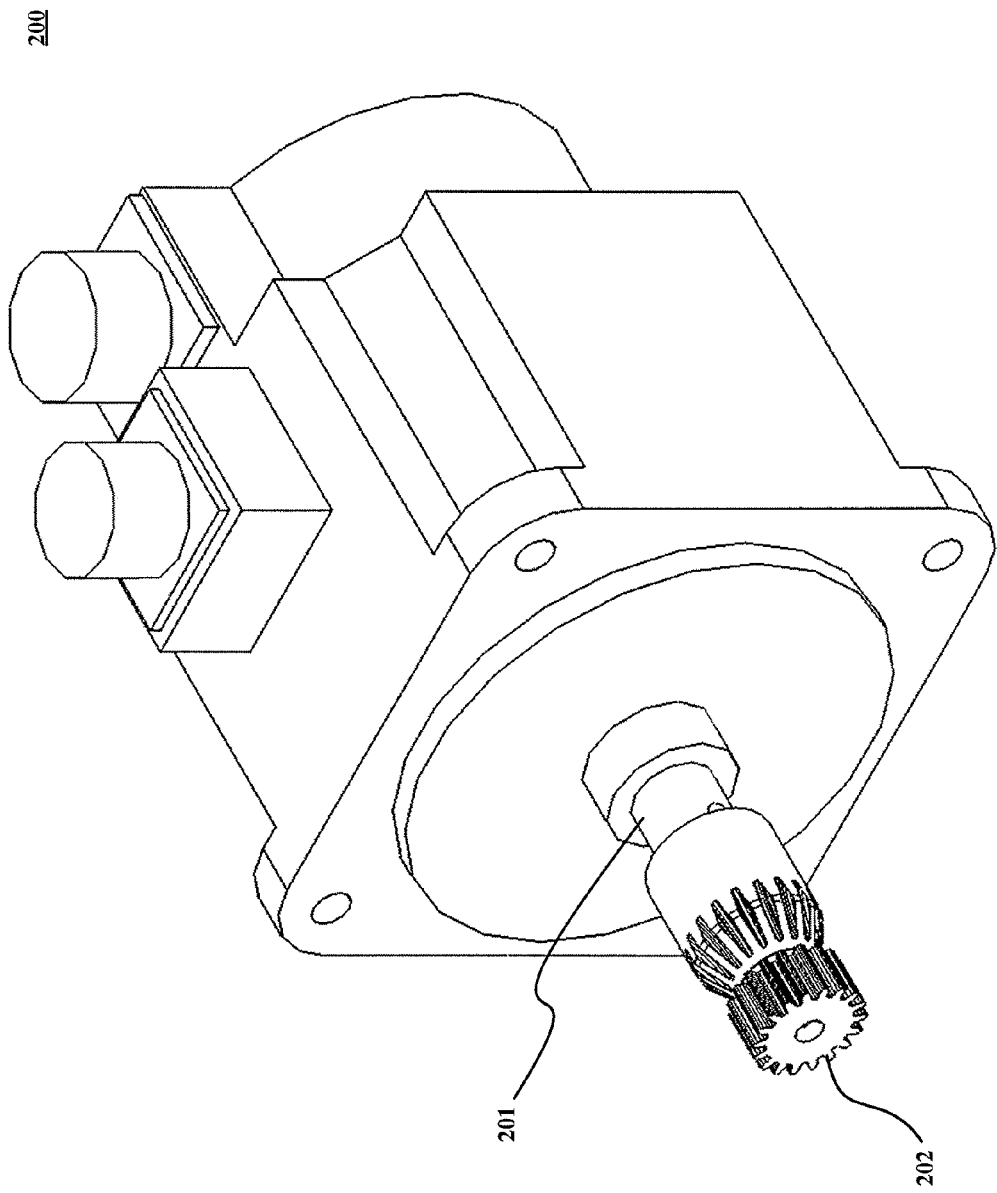
FIG. 2A illustrates a motor.

FIG. 2A illustrates a motor 200. The motor 200 may be used to generate force and apply the generated force to a door, such as the door 102 illustrated in FIG. 1, to move the door toward and away from its open or closed positions. The motor 200 may include a rotational shaft 201 connected to a rotational armature 202 having gear teeth, to deliver a force output corresponding to the force generated by the motor 200. The motor 200 may be any type of force generating element, including but not limited to an air cylinder, a DC motor, a DC motor with a slip clutch, a servo motor, a DC brushless servo motor, or any other electric motor of any construction, or any other device, to generate and apply force to the door for its movement.

Figure 2B:
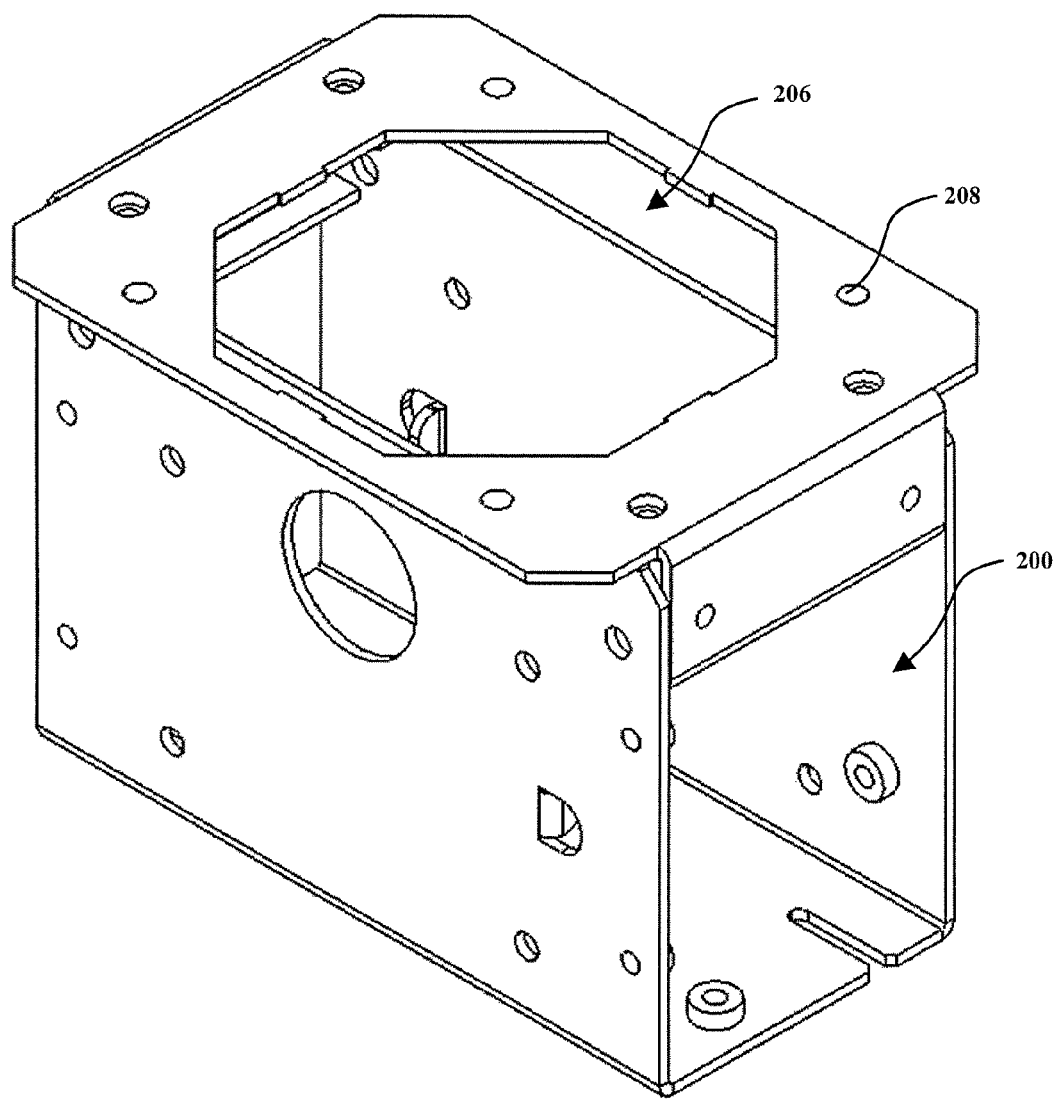
FIG. 2B illustrates a rack and pinion housing.

FIG. 2B illustrates a rack and pinion housing 204. The rack and pinion housing 204 may comprise a rigid surrounding with openings 206 for ingress and/or egress of moving parts associated with a rack and pinion. It may also include openings 208 for mounting to adjacent surfaces, for stability. The rack and pinion housing 204 may be constructed of various materials including metal, plastic or fiber-based materials, for example.

Figure 2C:
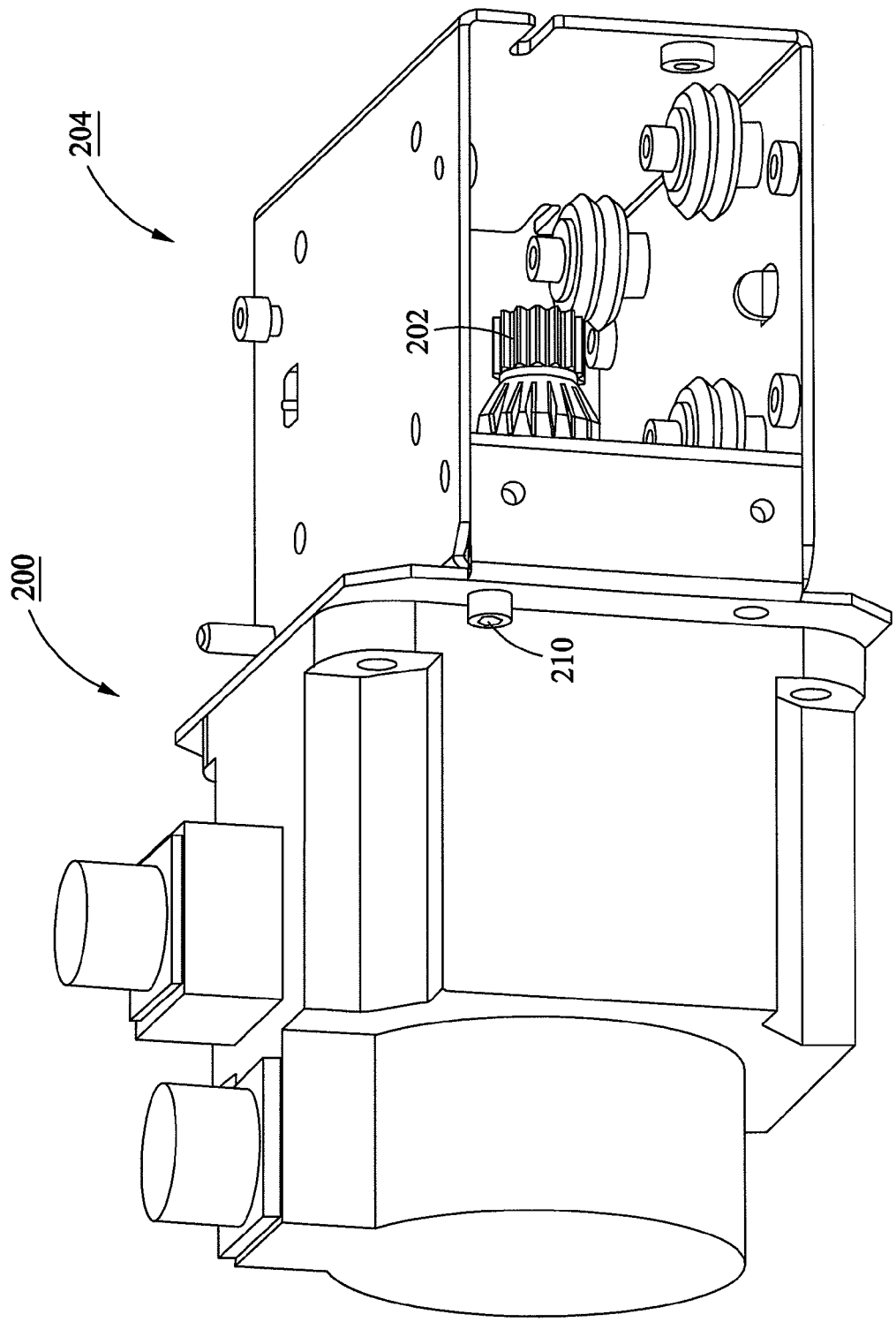
FIG. 2C illustrates the motor of FIG. 2A mounted to the rack and pinion housing of FIG. 2B, in an exemplary configuration.

FIG. 2C illustrates the motor of FIG. 2A mounted to the rack and pinion housing of FIG. 2B, in an exemplary configuration. Fasteners 210 may be used to secure the motor 200 to the rack and pinion housing 204. The motor 200 may be secured to the rack and pinion housing 204 such that the rotational armature 202 of the motor 200 extends within the rack and pinion housing 204. The rotational armature 202 may include gear teeth 212 such that it may be used as a gear. Thus, the rotational armature 202 may function as a pinion for a rack and pinion device, or may engage a separate gear that functions as the pinion.

Figure 3A:
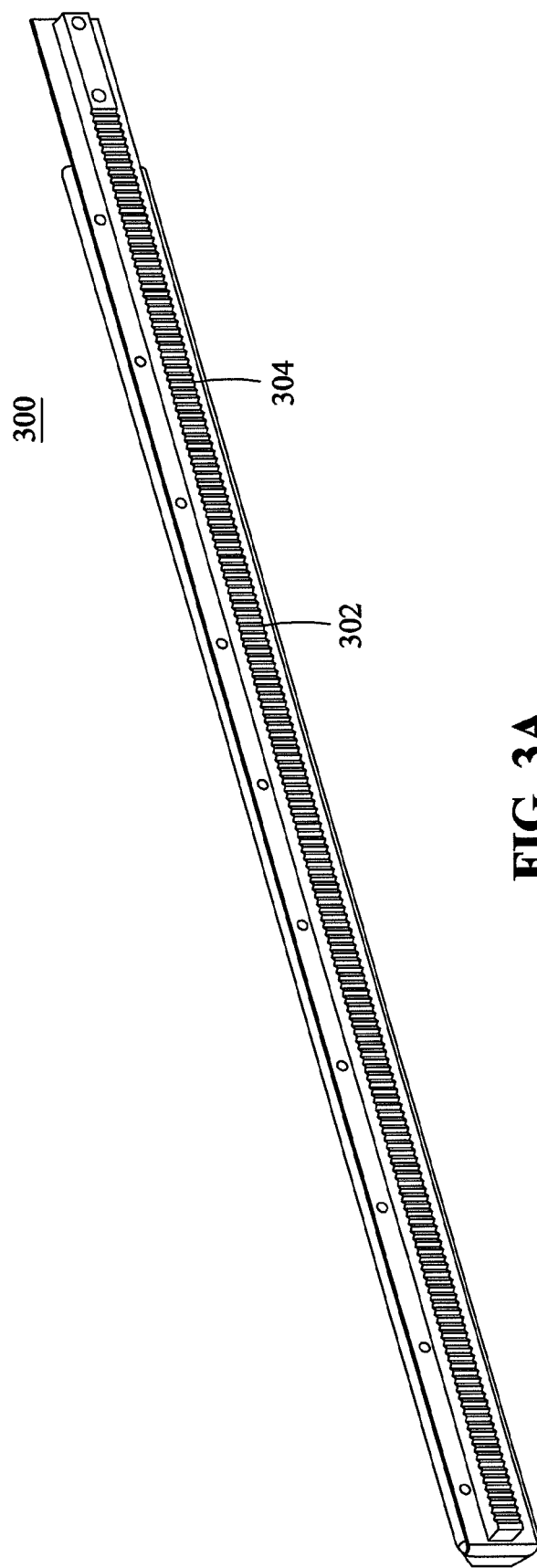
FIG. 3A illustrates an exemplary rack that can be included in a rack and pinion drive.

FIG. 3A illustrates an exemplary rack 300 that can be included in a rack and pinion drive. Those skilled in the art will recognize that rack and pinion gears are typically used to convert rotation into linear motion. One example of commonly used rack and pinion gear systems is the steering system on many cars. In the case of cars, the steering wheel may rotate a gear, whose teeth engage complementary grooves in the rack. As the gear turns, it can slide the rack either to the right or left, depending on which way a person turns the steering wheel. Another common use of rack and pinion gears is in grocery store produce scales. For example, when a piece of fruit is placed in the basket of the scale, the basket may lower in response to the weight that was placed on it. The basket may be connected to a rack, such that the rack is pulled downward as the basket lowers. If teeth in the rack are engaged in complementary grooves in a rotational gear, then as the rack moves downward in response to the weight, the rack may cause the gear to rotate. If the rotating gear is in turn attached to a rotating dial on the face of the scale, then as the basket lowers, a person may see the dial on the face of scale rotate the appropriate amount to display the amount of the weight. Returning now to FIG. 3A, rack 300 includes teeth 302 and grooves 304 that may be used to engage complementary grooves and teeth 212 in the rotational armature 202 of the motor 200, or of a separate pinion gear engaged with the rotational armature 202 of the motor 200.

Figure 3B:
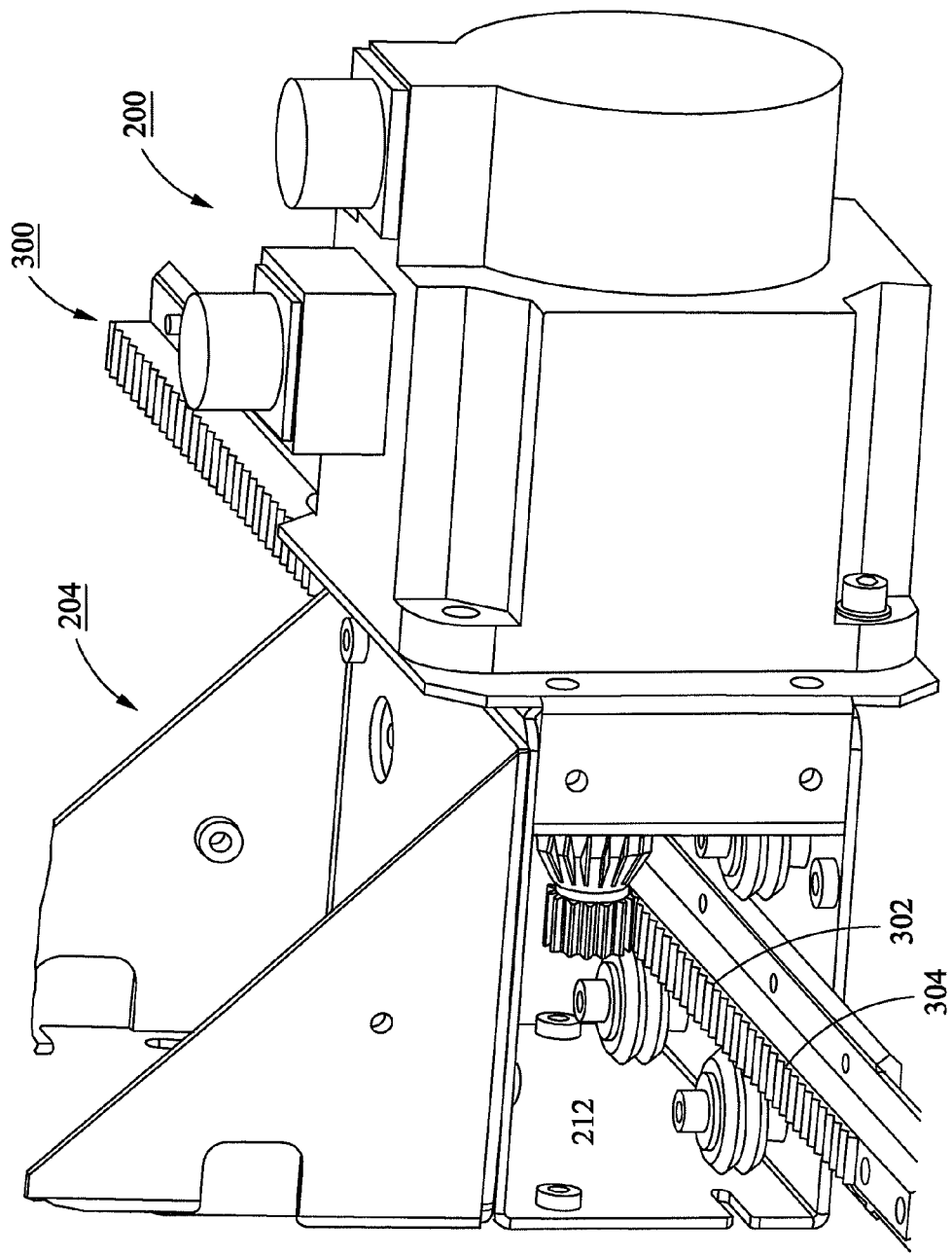
FIG. 3B illustrates the rack of FIG. 3A mounted within the motor and housing configuration of FIG. 2C.

FIG. 3B illustrates the rack 300 of FIG. 3A mounted within the motor and housing configuration of FIG. 2C. The teeth 302 and grooves 304 of the rack 300 may be aligned such that they can engage complementary grooves and teeth 212 in the rotational armature 202 of the motor 200. In this event, the rotational armature 202 of the motor 200 may be serving as the "pinion" in a rack and pinion configuration. Alternatively, a separate pinion gear may be engaged with the rotational armature 202 of the motor 200, and also engaged with the rack 300. Those skilled in the art will recognize that various configurations are suitable. As illustrated in FIG. 3B, as the rotational armature 202 of the motor 200 rotates, the rack 300 may slide back and forth.

Figure 3C:
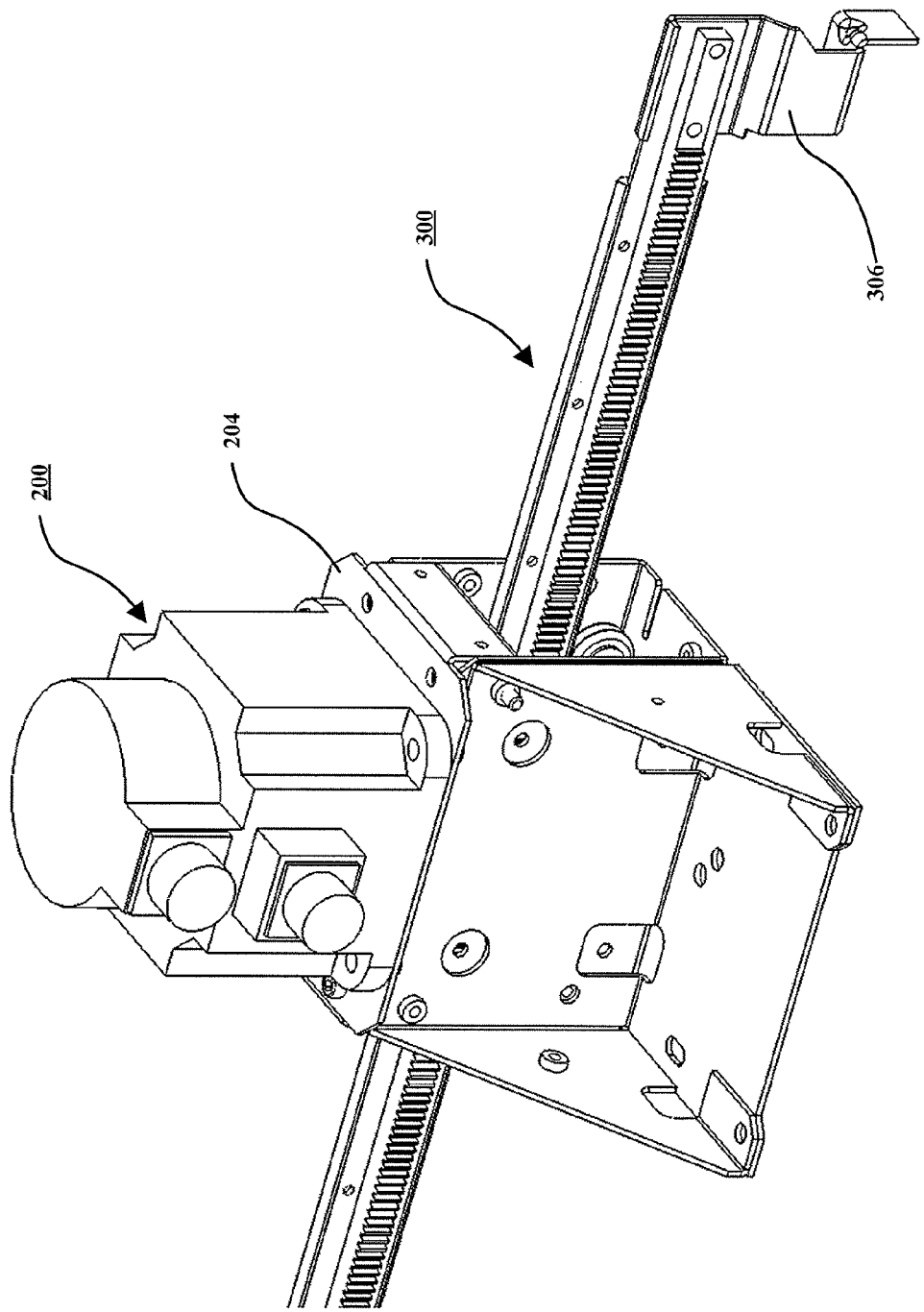
FIG. 3C illustrates a different perspective of FIG. 3B.

FIG. 3C illustrates a different perspective of the rack and pinion configuration of FIG. 3B. At one end of the rack 300, there may be a flange or support 306 for securing the rack 300 to a device. The device secured to the support 306 may then move back and forth in unison with the movement of the rack 300. The device secured to the support 306 may be, for example, a door that can slide back and forth to be opened or closed.

Figure 4A:
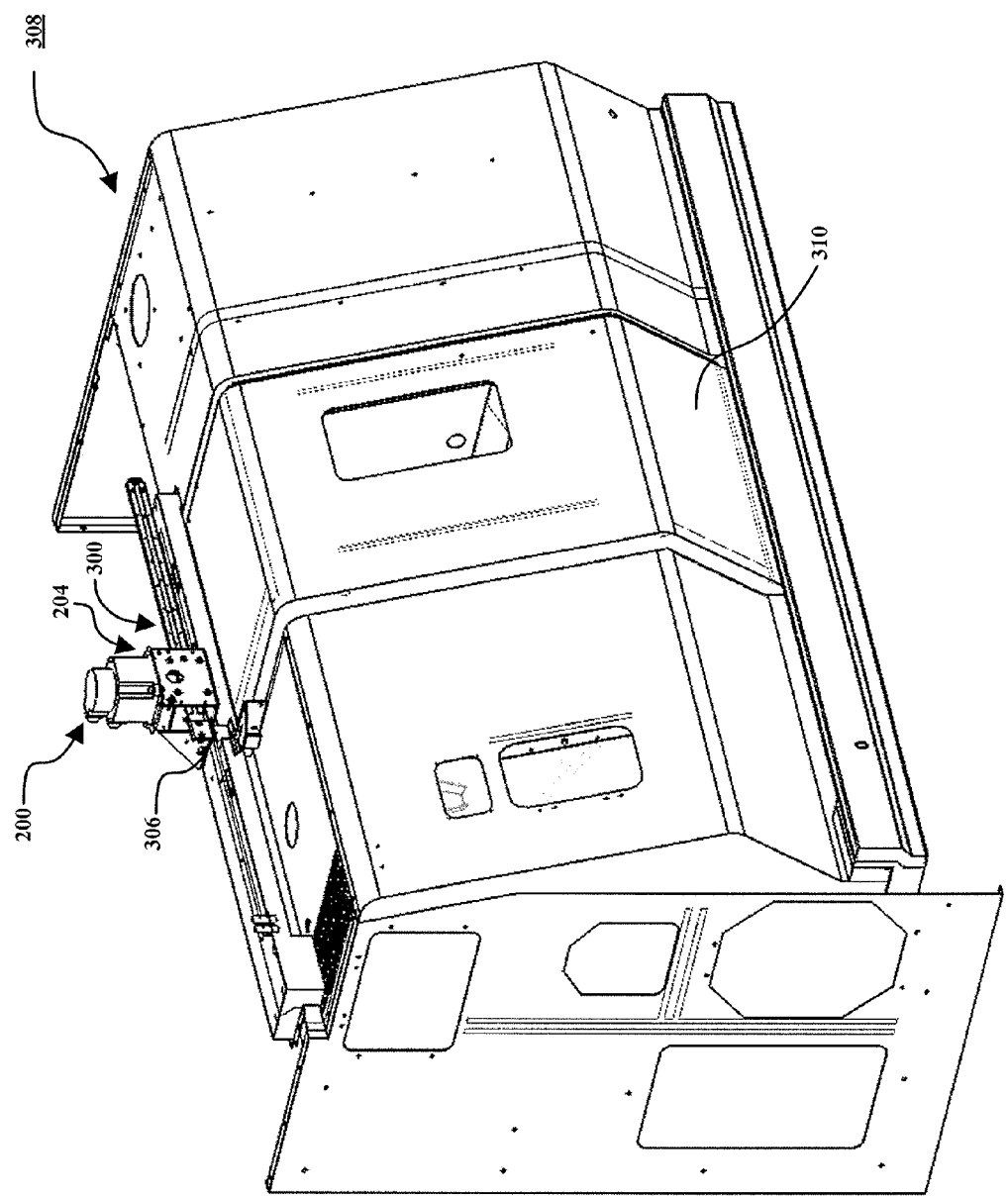
FIG. 4A illustrates the motor and rack and pinion configuration of FIGS. 3B and 3C mounted on an exemplary CNC machine.
Figure 4B:
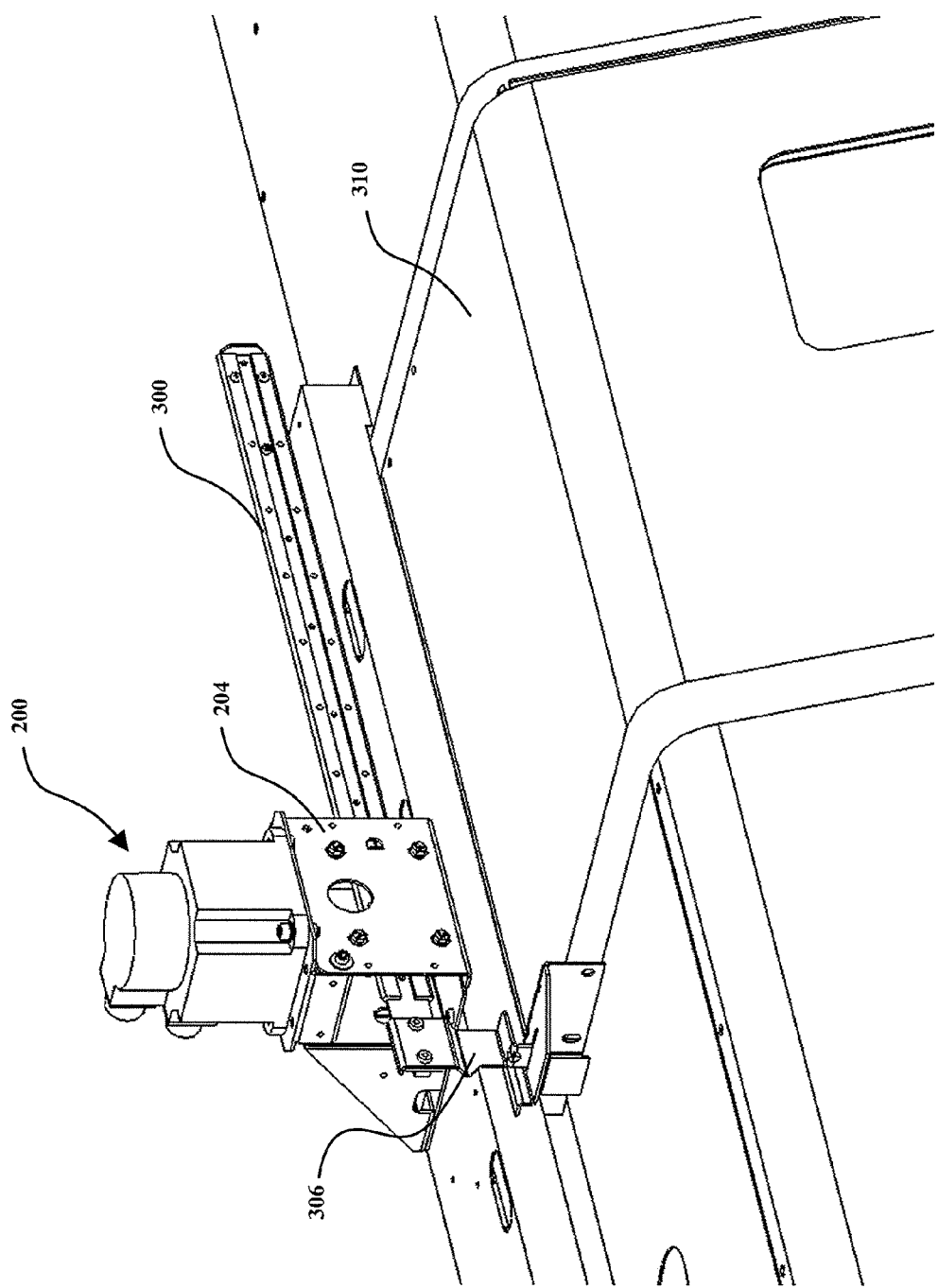
FIG. 4B illustrates a different perspective of FIG. 4A.

FIG. 4A illustrates the motor 200 and rack and pinion configuration of FIGS. 3B and 3C mounted on an exemplary CNC machine 308. While it will be apparent to those skilled in the art that the subject technology may be practiced in many applications other than a CNC machine, the specific example of a CNC machine provides a useful reference for understanding the concepts of the subject technology. The CNC machine may include a door 310 secured to the support 306 on one end of the rack 300. Accordingly, as the motor 200 generates force and causes the rotational armature (not shown) to rotate, the rack and pinion assembly (not fully shown) inside the rack and pinion housing 204 may cause the rack 300 to move back and forth, in turn moving the door 310 to move back and forth in connection with the movement of the rack 300. Certain of these aspects are illustrated in closer detail in FIG. 4B.

Figure 5A:
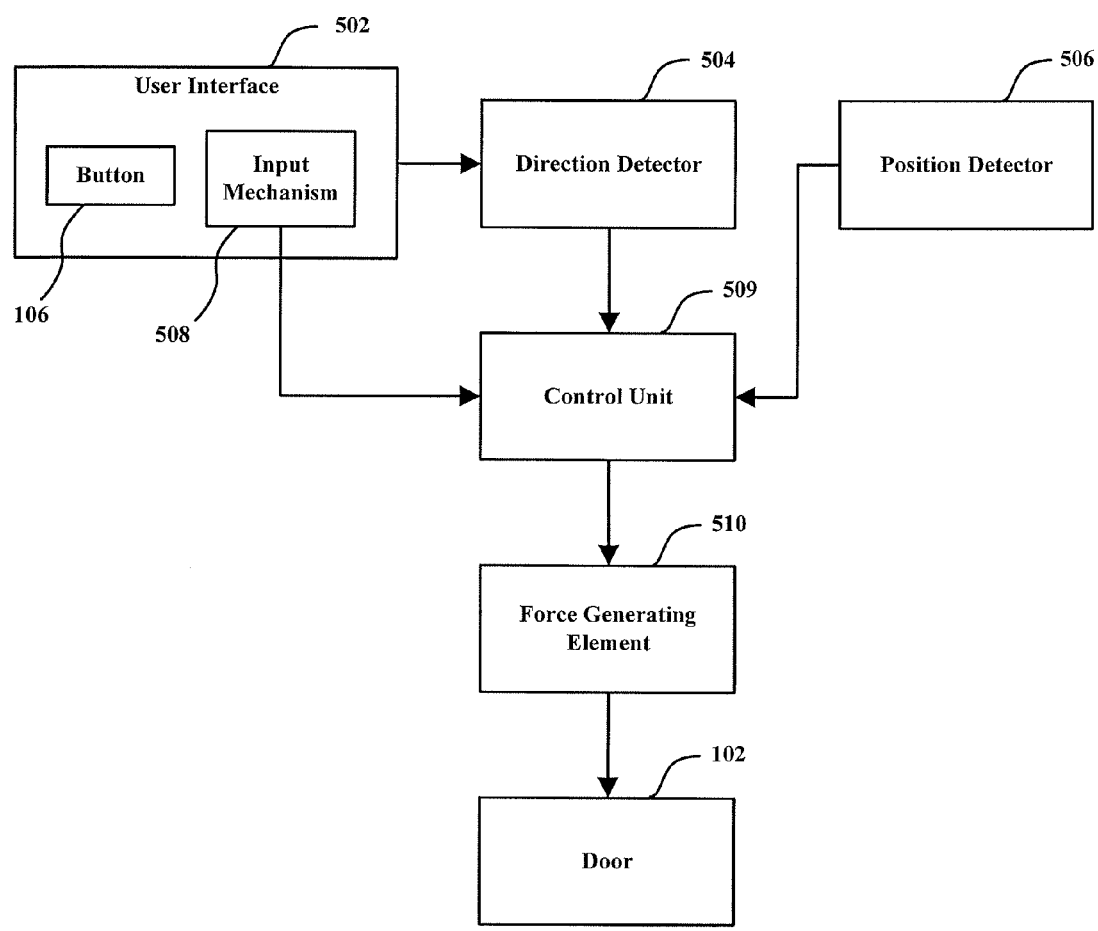
FIG. 5A illustrates a control system that may control the motion of a moveable door.

FIG. 5A illustrates a control system 500 that may control the motion of a moveable door, such as the door 102 described above with reference to FIG. 1. The control system may include a user interface 502 so that an operator can interact with the machine that includes the door 102. For example, the user interface 502 may include a mechanism that allows the operator to command the door 102 to open and close. The mechanism may comprise, for example, a button, such as the button 106 described above with reference to FIG. 1. The user interface 502 may alternatively or additionally include a switch, a lever, a keypad, a voice-activated sensor, or other user input mechanism for receiving input from the operator relating to a command from the operator to open or close the door 102.

The user interface 502 may further include an input mechanism 508, to allow the operator to program other aspects of the machine. For example, through the input mechanism 508, an operator may be able to program position, speed, timing, and other parameters of a workpiece to be placed within the machine, as well as similar parameters for the tools inside the machine. The input mechanism 508 may include a screen and an input device such as a keypad. Other alternatives for the input device include a cursor control device, jog handle, etc.

The input mechanism 508 may also receive signals that can be used by a control unit 509 for controlling the motion of the door 102. For example, after the operator puts a workpiece inside the machine and inputs a program into the input mechanism 508, he may press the button 106. Pressing the button 106 after entering the program into the input mechanism 508 may cause a control unit 509 to detect that the door 102 is open and that the operator wants the door 102 to be closed, concealing the workpiece that the operator placed into the machine, so that the operator's program (that was entered into the input mechanism 508) may be executed. In other words, if the program includes instructions to the machine for working on the workpiece, then when the operator presses the button 106, the machine may interpret the button press as a command to close the door 102 so that the program can be executed to work on the workpiece. In that case, the control unit 509 may cause the door 102 to close, and the program to begin execution. Conversely, at the end of a program, the control unit 509 may detect the program is over and interpret that detection as a command from the operator to open the door 102. Or, the control unit 509 may wait for another button press by the operator after the program is done executing. In either event, the control unit 509 may cause the door 102 to open so that the operator can retrieve the workpiece at the end of the program. Details of the control unit 509 will be described in further detail below.

In addition to the user interface 502, the control system may 500 may include a direction detector 504 that detects the direction that the door 102 is moving, for example towards or away from an opened or closed position. The direction detector 504 may include, for example, a button such as button 106 described above with reference to FIG. 1. In that case, the direction detector 504 may receive a signal from the button 106 indicating whether the door 102 is moving in an opening or closing direction. For example, if the door is in the opened position when the direction detector 504 receives a signal from the button 106, the direction detector 504 may determine that the signal indicates the door is moving toward the closed direction. Likewise, if the door is in the closed position when the direction detector 504 receives a signal from the button 106, the direction detector 504 may determine that the signal indicates the door is moving toward the opened direction. The direction detector 504 may alternatively be a motion sensor or position detector, and may comprise one or more of an encoder, range finder, sonar device, laser interferometer or accelerometer, for example, that can physically detect the direction the door 102 is moving or detect certain characteristics of the moving door from which the direction of motion may be calculated. For example, the direction detector 504 may detect sequential positions of the moving door, and be able to discern from the relativity of the sequential positions which direction the door is moving.

The control system 500 may also include a position detector 506 configured to detect a current position of the door 102 as the door 102 is moving. The position detector 506 may comprise an encoder, for example. Other alternatives for the position detector 506 may include a range finder, sonar device, laser interferometer or accelerometer, for example. The position detector 506 may be a linear position detector, or may include an encoder for transforming detected angular motion into detected linear motion. The position detector 506 may comprise a sensor integrated in a motor that drives the door 102, or may be a component separate from but operably connected to the motor. The position detector 506 may detect a current position of the door 102 at frequent intervals while the door 102 is in motion, for example 1000 times per second. It will be recognized by those skilled in the art that the subject technology is not limited to this sampling rate, and that many different rates may be used for detecting the current position of the door 102. The sampling rate may be selected, for example, such that the door operates smoothly without consuming unnecessary processing capacity. Those skilled in the art will recognize that if the sampling rate is too low, the door may have jerky or stuttering movement. On the other hand, a sampling frequency higher than what is required to establish smooth movement of the door may be unnecessary and consume processing capacity of the position detector. The position detector 506 may generate a signal when the current position of the door is detected, and send the signal to the control unit 509. The control unit 509 may be operatively connected to a force generating element 510 such as, for example, the motor 200 described above with reference to FIG. 2A. The force generating element 510 may be operatively connected to the door 102, such that force output from the force generating element 510 is controlled by the control unit 509 and applied to the door to control the motion of the door 102.

The control unit 509 may control the force generating element 510 in response to signals it receives from the direction detector 504 and position detector 506. For example, the control unit 509 may receive a signal from the direction detector 504 indicating which direction the door is moving with respect to an expected closed position of the door. Based on the indicated direction, the control unit 509 may regulate the amount of force generated by the force generating element 510. In particular, if the door is moving in an opening direction, the control unit 509 may allow the force generating element 510 to operate at a high capacity or maximum capacity, without limiting the amount of force generated. Because the door 102 may pose little to no safety risk to an operator or bystander while it is opening, there may be little or no reason to restrict the amount of force applied to it by the force generating element 510. On the other hand, while the door 102 is moving in a closing direction, it may pose some danger to an operator or bystander. For example, it may be possible that a body part could be caught in the pathway of the door 102, and that the door 102 could close on, pinch, or crush the body part. Accordingly, the control unit 509 may operate to decrease the amount of force that is generated by the force generating element 510 and applied to the door 102, so that the door moves with less power or less torque in the closing direction, thereby decreasing the risk to the operator or bystander during that time.

In addition, the control unit 509 may regulate the amount of force based on particular positions that the door 102 may be in during its travel in the closing direction. For example, the door 102 may pose little to no danger, even when moving in the closing direction, while the opening (e.g., the distance between the door's current position and its expected closed position) is greater than a threshold value. Accordingly, as long as the opening remains greater than that threshold value, the control unit 509 may not restrict the amount of force applied to the door 102 by the force generating element 510. On the other hand, while the door 102 is moving in a closing direction and the opening is smaller than the threshold value, it may pose some danger to an operator or bystander. Accordingly, when the door 102 is moving in the closing direction and its position is within a certain "danger zone" (for example, the opening is smaller than the threshold value), the control unit 509 may operate to decrease the amount of force that is generated by the force generating element 510 and applied to the door 102, so that the door moves with less power or less torque in the closing direction, thereby decreasing the risk to the operator or bystander during that time.

Those skilled in the art will recognize that different applications and different situations will involve different "danger zone" sizes, and different parameters for the "danger zone." For example, in the case of a CNC machine, a "danger zone" could be established as any opening of the door that is smaller than an average human body, because any opening smaller than that may cause an increased risk that a body or body part could become trapped in the closing door. Alternatively, it could be established as any opening of the door that is smaller than a certain part of a human body, such as an average human shoulder width, because smaller body parts or appendages may be more prone to becoming trapped or more susceptible to force-type injuries than an entire body. Setting parameters to define the "danger zone" could be based on other considerations as well. Location of a workpiece within a CNC machine could impact the size and location of the "danger zone." For example, if a workpiece is to be centered within the machine, the "danger zone" could potentially include any opening defined by a closing door that has moved past the center of the doorway, where an operator is most likely to be standing in that case. Those skilled in the art will recognize that a number of different considerations may affect and contribute to the size and location of an appropriate "danger zone" and the associated threshold values for any particular application. The "danger zone" may be any opening that represents an enhanced risk of injury to the operator, and may be defined by an operator setting threshold values by which entry of the door into the "danger zone" can be detected, measured or calculated.

At any point in time during the door's motion, the width of the opening may be determined, for example, by performing a calculation on information received from the position detector 506 indicating the door's current position, and known values such as the door's expected closed position. The width of the opening could also be detected by the position detector 506, or it could be retrieved from memory, for example from a lookup table based on a detected current position and the known closed position. Those skilled in the art will recognize the subject technology is not limited by any particular method of determining the distance between the detected current position and the expected closed position and that various methods are possible.

While the door 102 is moving in a closing direction, the position detector 506 may frequently sample the position of the door 102 and the control unit 509 may read input information from the position detector 506 to determine whether the current position of the door is within the danger zone, and whether the amount of force generated and applied to the door 102 should be limited.

In addition to adjusting the amount of force, the control unit 509 may operate to control acceleration of the moving door 102. Apart from the safety reasons described above, it may be desirable for the door 102 to move at a greater acceleration when it is opening than when it is closing. It may also be desirable for the door 102 to move at a greater acceleration when it first begins moving in the closing direction, but to reduce the acceleration at some point toward the end of its travel. Moving at a greater acceleration at the beginning of its travel may save time for the operator, who does not have to wait for a very slowly moving door 102. Reducing the maximum acceleration not only provides safety for the operator, but may also cause the door to slow down to a safer speed, and enable a more controlled and softer close when the door 102 eventually reaches its closed position. Accordingly, when the door 102 is moving in the closing direction, the control unit 509 may utilize input from both the direction detector 504 and the position detector 506 to calculate an appropriate acceleration for the door 102, and an appropriate amount of force to be generated by the force generating element 510 and applied to the door 102.

The control unit 509 may perform certain calculations using input from both the direction detector 504 and the position detector 506 to determine appropriate acceleration and force. For example, the control unit 509 may receive a signal from the direction detector indicating the distance between the detected current position and the closed position (the opening width), and assess whether the opening width is greater than or less than a threshold value. The threshold value may be set, for example, to be the size of a person's body or the size of a larger body part, such as a torso or limb or appendage, for example. Of course, those skilled in the art will recognize that the subject technology is not limited to use with any particular threshold value, and that the threshold value may be selected and programmed based on appropriate safety considerations for whatever application is being utilized.

If the control unit 509 determines that the opening is less than the threshold value, then it may set the acceleration and regulate the amount of force based on whether the detected current position is ahead of or behind an expected current position of the door 102. For example, if output from the position detector 506 indicates the detected current position of the door 102 is ahead of its expected current position, then the door 102 may be moving too quickly within the danger zone and may need to apply the maximum amount of force available from the force generating unit 510 to decelerate and return to its target position. Accordingly, in this situation the control unit 509 may set the acceleration to be a negative value (i.e. so that the door 102 decelerates) and increase the amount of available force. On the other hand, if output from the position detector 506 indicates the detected current position of the door 102 is behind its expected current position, then the door 102 may be moving too slowly within the danger zone. While a standard servo motor may attempt to correct this perceived error in door position by maximizing power and/or increasing acceleration the get the door 102 back on target, in this case the detected position may indicate a safety risk. For example, the door 102 may be behind its expected position because something, such as a body part, has become lodged in the pathway of the door. Accordingly, the control unit 509 may decelerate the door 102 to a stop and also eliminate the force being generated by the force generating unit 510 such as by stopping the force generating unit 510 and/or disengaging the force generating unit 510 from the door 102.

Figure 5B:
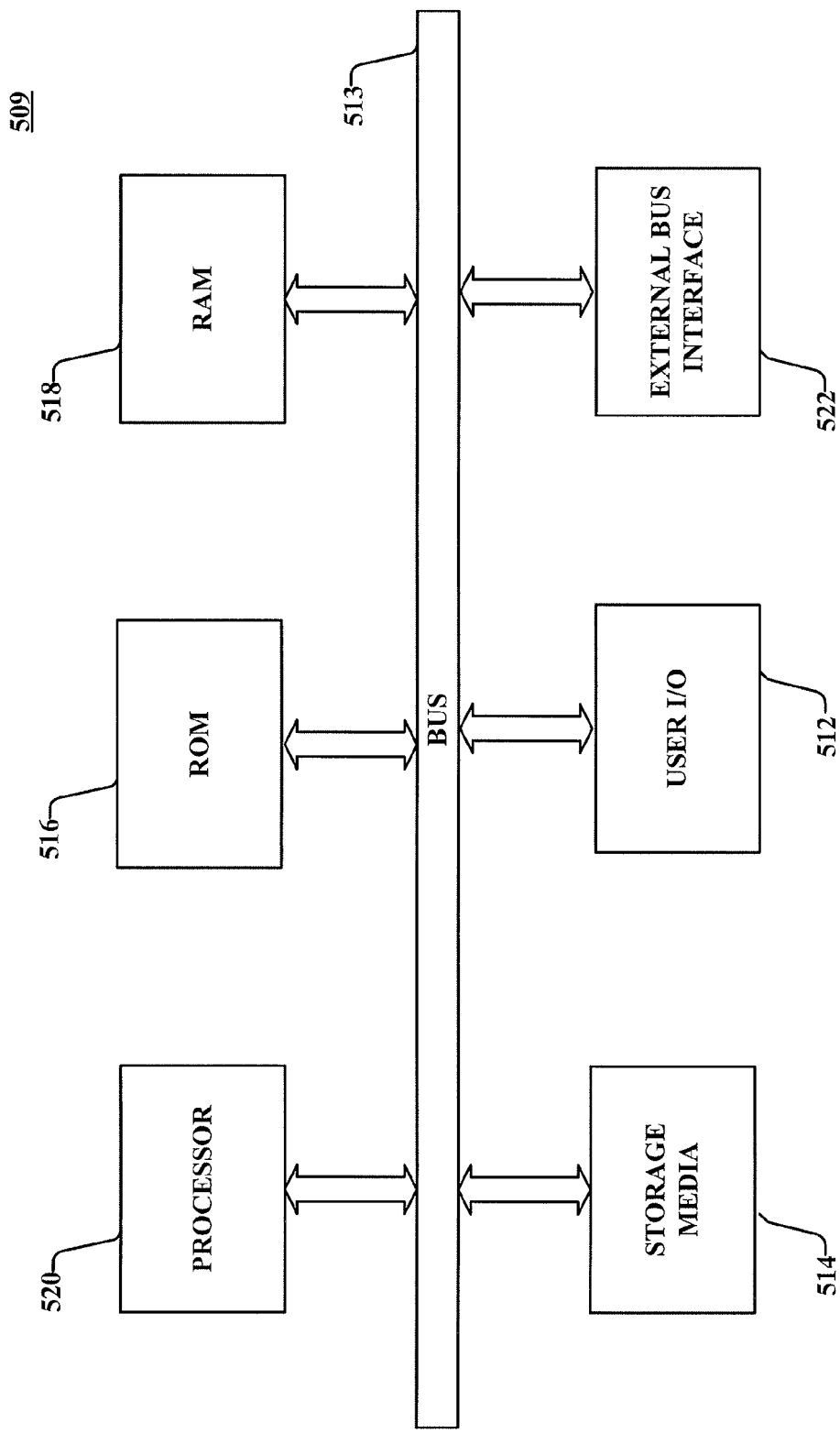
FIG. 5B illustrates other components that may be included in the control system 500.

FIG. 5B illustrates other components that may be included in the control system 500. In particular, the control unit 509 described above with reference to FIG. 5A may be configured as illustrated in FIG. 5B. The control unit 509 may include user input/output ("I/O") 512 coupled to a bus 513. The user I/O 512 may include user interface 502 illustrated in FIG. 5A. The control unit 509 may also include storage media 514, read-only memory ("ROM") 516 and random-access memory ("RAM") 518. A processor 520 may be configured to execute sequences of instructions to implement an automatic door with position-dependent torque limiting, based on the door's position with respect to the defined "danger zone." The processor may be configured to execute these sequences of instructions based on instructions contained in the storage media 514, as well as information received via the bus 513, including information from the user I/O 512 and information from an external bus interface 522. The external bus interface 522 may receive information from other components of the control system 500, such as the direction detector 504, position detector 506, and user interface 502, described above with reference to FIG. 5A. The processor 520 may be a general-purpose microprocessor, a microcontroller, a Digital Signal Processor ("DSP"), an Application Specific Integrated Circuit ("ASIC"), a Field Programmable Gate Array ("FPGA"), a Programmable Logic Device ("PLD"), a controller, a state machine, gated logic, discrete hardware components, or any other suitable entity that can perform calculations or other manipulations of information necessary to execute sequences of instructions.

ROM 516 may be a non-volatile storage device that stores static instruction sequences such as basic input/output system ("BIOS") executed by the processor 520 at start-up to initiate operation of the control system 509. RAM 518 may be a volatile storage device that temporarily stores information and instruction sequences to be executed by the processor 520. The storage media 514 represents a non-volatile storage device for storing information and instruction sequences, for example sequences of instructions to implement an automatic door with position-dependent torque limiting, based on the door's position with respect to the defined "danger zone." The storage media 514 may include magnetic media (e.g., hard drive, tape drive, floppy drive, etc.), optical media (e.g., CD-ROM, DVD, etc.), or electronic media (e.g., Flash memory, PROM, EPROM, EEPROM, etc.). Each of these types of storage devices represents an example of computer-readable media that is suitable for storing computer-executable instructions.

The User I/O 512 represents one or more user interfaces, or ports configured to communicate with one or more user interfaces, configured to communicate information between an operator and the control unit 509. Exemplary user interface devices include display devices, keyboards, cursor control devices, jog handles, etc. Using these devices, an operator can communicate with the CNC machine.

The external bus interface 522 may facilitate communication of information and control signals between the control system 509 and other components of the control system 500, such as the direction detector 504, position detector 506, and user interface 502, which are described above with reference to FIG. 5A. Additionally, the control unit 509 may send control signals to components in the control system, such as to the force generating element 510 described above with reference to FIG. 5A, during execution of the instructions for controlling movement of the door based on the door's position with respect to the defined "danger zone."

As represented in FIG. 5B, the components of the control unit 509 may be coupled to the bus 513. The bus 513 represents one or more communication buses for communicating information and instructions between the components of control unit 509. The control unit 509 is not limited to a configuration in which all components are coupled directly to a single bus. Alternative arrangements may include multiple buses linked by other components. It is further noted that control unit 509 may include other components besides those depicted in. FIG. 5B. For example, control unit 509 may include a network interface for coupling the control unit 509 to an external network.

To perform the various adjustments in force, acceleration and door position described above, the control unit 509 may include a "PID controller." "PID" stands for Proportional, Integral, Derivative, which are the types of elements that may be included in a PID controller. PID controllers may be designed to eliminate the need for continuous operator attention. Cruise control in a car and a house thermostat are common examples of how PID controllers can be used to automatically adjust some variable, to hold a measurement at the expected position, i.e. where you would like the measurement to be. "PID control" is typically a method of feedback control that uses the PID controller as the main tool.

Figure 6:
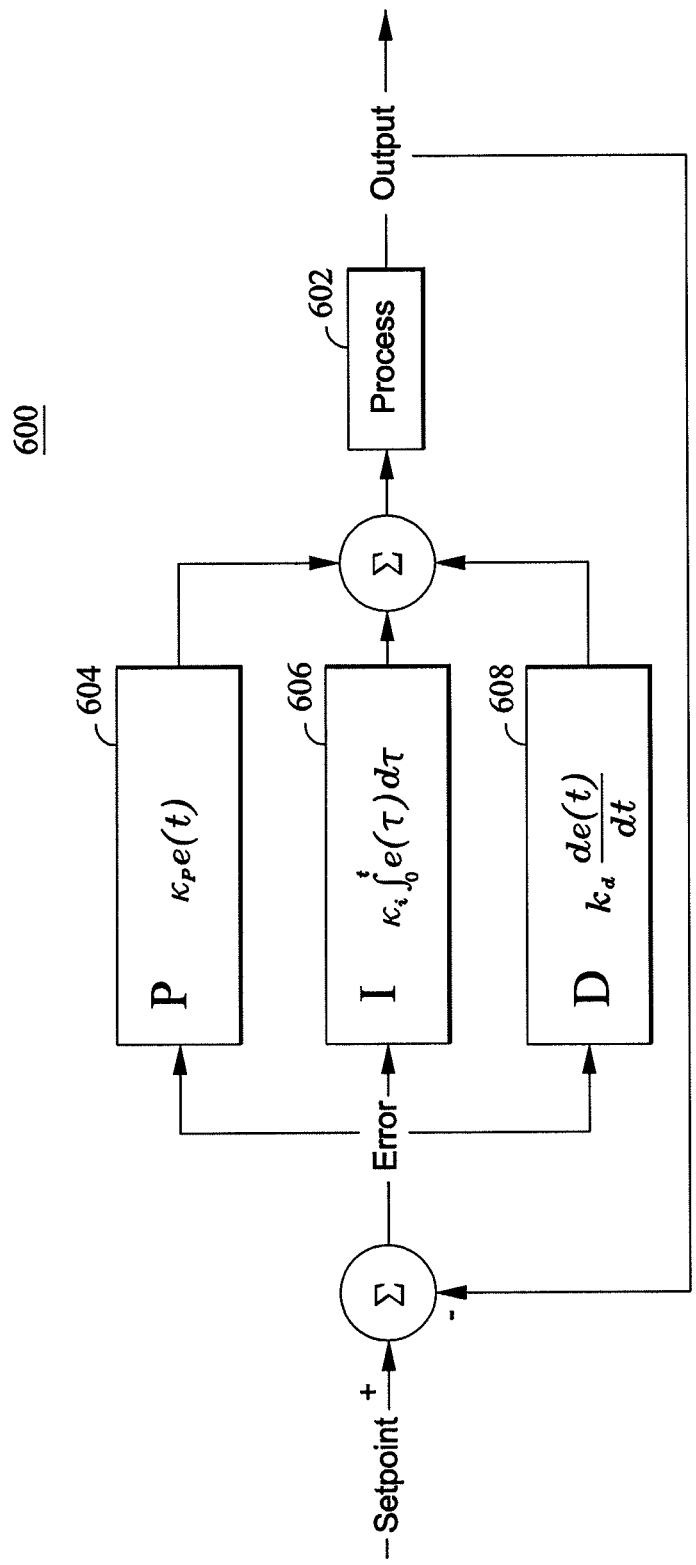
FIG. 6 illustrates an exemplary PID controller.

FIG. 6 illustrates an exemplary PID controller 600. The "process" 602 may be whatever process needs to be controlled by the PID controller 600. In the subject technology, the process may be, for example, motion of an actuating door. A control function, for controlling the process 602, may be implemented by PID feedback-based control. The PID controller may include three elements, proportional, integral and derivative, having certain characteristics. The proportional element 604 may generate output that is proportional to the measured error at the instant t, which may be considered the "present" error. The integral element 606 may generate output that is proportional to the integral of the error up to the instant t, which may be interpreted as the accumulation of the "past" error. The derivative element 608 may generate output that is proportional to the derivative of the error at the instant t, which can be interpreted as the prediction of the "future" error. Thus, for any given measurement, such as a measurement by the position detector 506 described above, the PID controller 600 may use outputs from its three component elements that represent present error, past error and predicted future error. Using these three component outputs as feedback, the PID controller can calculate an appropriate output to apply to the process P(s) that will reduce the error. Those skilled in the art will recognize the various features, functions and design parameters for PID controllers. The following description of various processes for moving a door may utilize a PID controller. For example, to monitor the position of the moving door and correct its position as it travels, subject to certain safety-inspired functions that will be described in further detail below. Those skilled in the art will recognize that the PID controller may be implemented in a number of different forms, including software, digital logic, hardware, or some combination of these.

FIGS. 7A to 11 illustrate processes implemented to control the motion of a moveable door according to various aspect of the technology described herein. Each of these processes may be implemented by a processor, such as processor 520, loading and executing one or more sequences of instructions. The sequences of instructions may be stored in a computer-readable medium such as storage media 514, RAM 518 and/or ROM 516. The sequences of instructions may be retrieved from the computer-readable media for execution by the processor in response to user input from an operator, a program call from other instructions being executed by the processor, etc. The processes depicted in FIGS. 7A to 11 are described in more detail below.

Figure 7A:
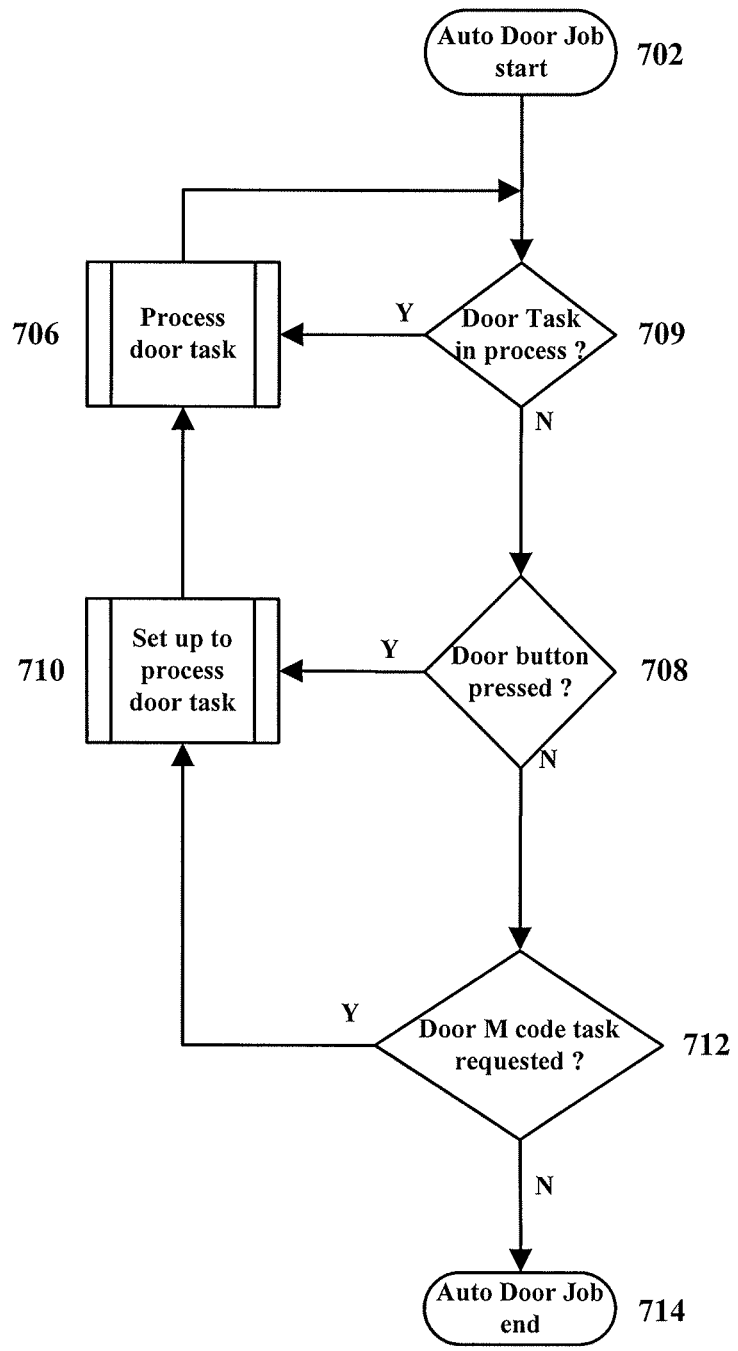
FIG. 7A is a flow diagram illustrating a process for moving a door.

FIG. 7A is a flow diagram illustrating a process for moving a door. At block 702, a program including instructions for moving the door may begin. It may be started, for example, when an operator presses a button such as button 106 on the control panel 108 described above with reference to FIG. 1. At decision block 704, the program may determine whether a door task, such as opening or closing the door, is currently in process. If it is determined that the door task is in process, then at block 706 the program may process the door task, which is described in further detail below with reference to FIG. 8A. Otherwise, the program may determine at decision block 708 whether or not the door button, such as button 106, has been pressed. If the button was pressed, then at block 710 the program may set up or initiate a door task so it may be processed at block 706. For example, if the door is closed, an operator may push the button 106 which may cause initiation of a task to open the door. Conversely, if the door is open, an operator may push the button 106 which may cause initiation of a task to close the door. The process for setting up to process the door task, shown at block 710, is described in further detail below with reference to FIG. 7B.

Returning to decision block 708, if it is determined that the door button was not pressed, then at decision block 712 the program may determine whether a door task, such as opening or closing the door, was requested by some other means. As explained above, events other than pressing a button may cause a door task to initiate. For example, completion of work on a workpiece inside the CNC machine, which may be indicated by the conclusion of a program, may result in a door task request to open the door. If a door task request is detected, then at block 710 the program may set up or initiate the door task so it may be processed at block 706. Otherwise, the program for moving the door may end at block 714.

Figure 7B:
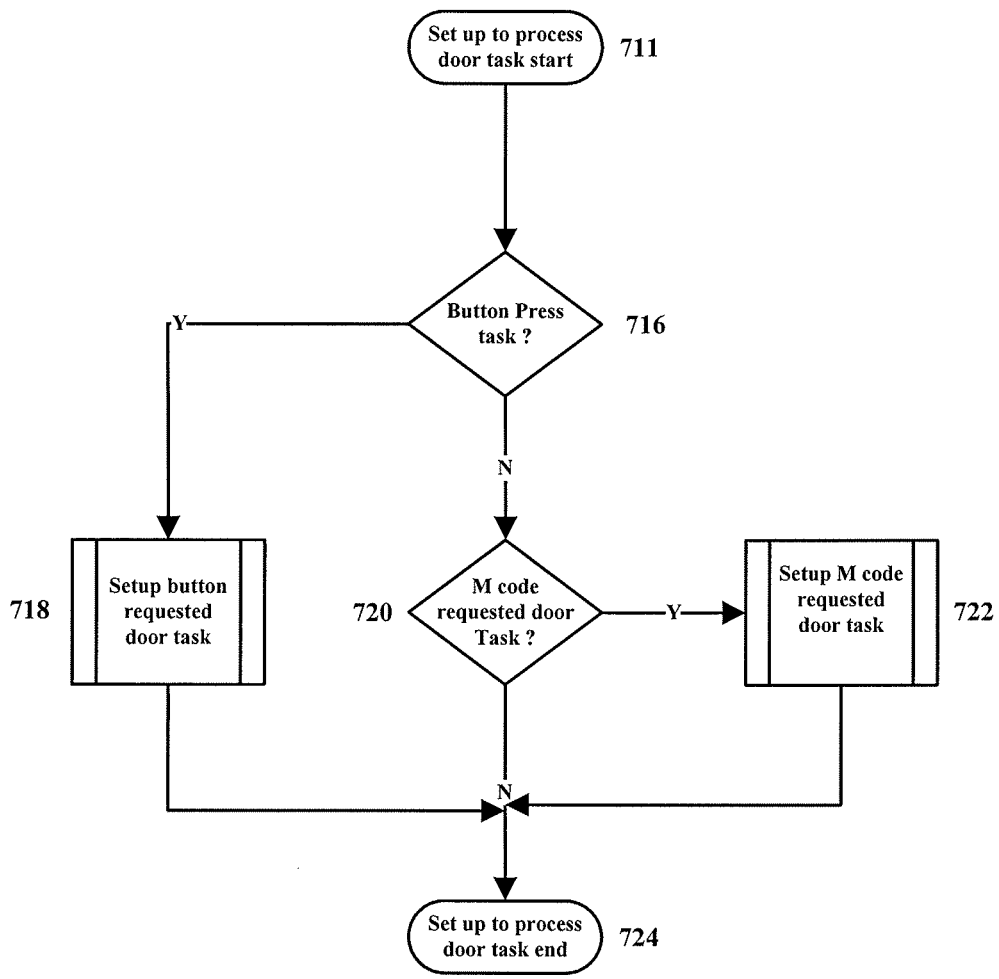
FIG. 7B is a flow diagram illustrating further aspects of the process in FIG. 7A.

FIG. 7B is a flow diagram illustrating details of a process 710 for initiating a door task, which is referenced at block 710 in FIG. 7A. The process may begin at block 711, with setting up to process the start of the door task. The program may first determine at decision block 716 whether the door task has been initiated by an operator pressing the button 106. If so, then at block 718 the program may set up or initiate whatever task was requested by the button press. This will be described in further detail below, with reference to FIG. 7C. As explained above, depending on the current state of the door when the button 106 is pressed, the button press may initiate a task to either open or close the door. The appropriate door task may be set up to be processed, e.g. at block 718 or 722, before this portion of the program terminates at block 724. Returning to decision block 716, if it is determined that the door task was not initiated by a button press, then the program may determine at decision block 720 whether a door task was requested by some other mechanism, for example the end of a program for working on a workpiece behind the closed door in a CNC machine. If so, then at 722, the particular requested door task may be set up to be processed, which will be described in further detail below with reference to FIG. 7D. In any event, the program may terminate this function with the door task being set up for processing at block 724. At that point, the process may return to exit from block 710 in FIG. 7A, i.e. to proceed to block 706 in FIG. 7A.

Figure 7C:
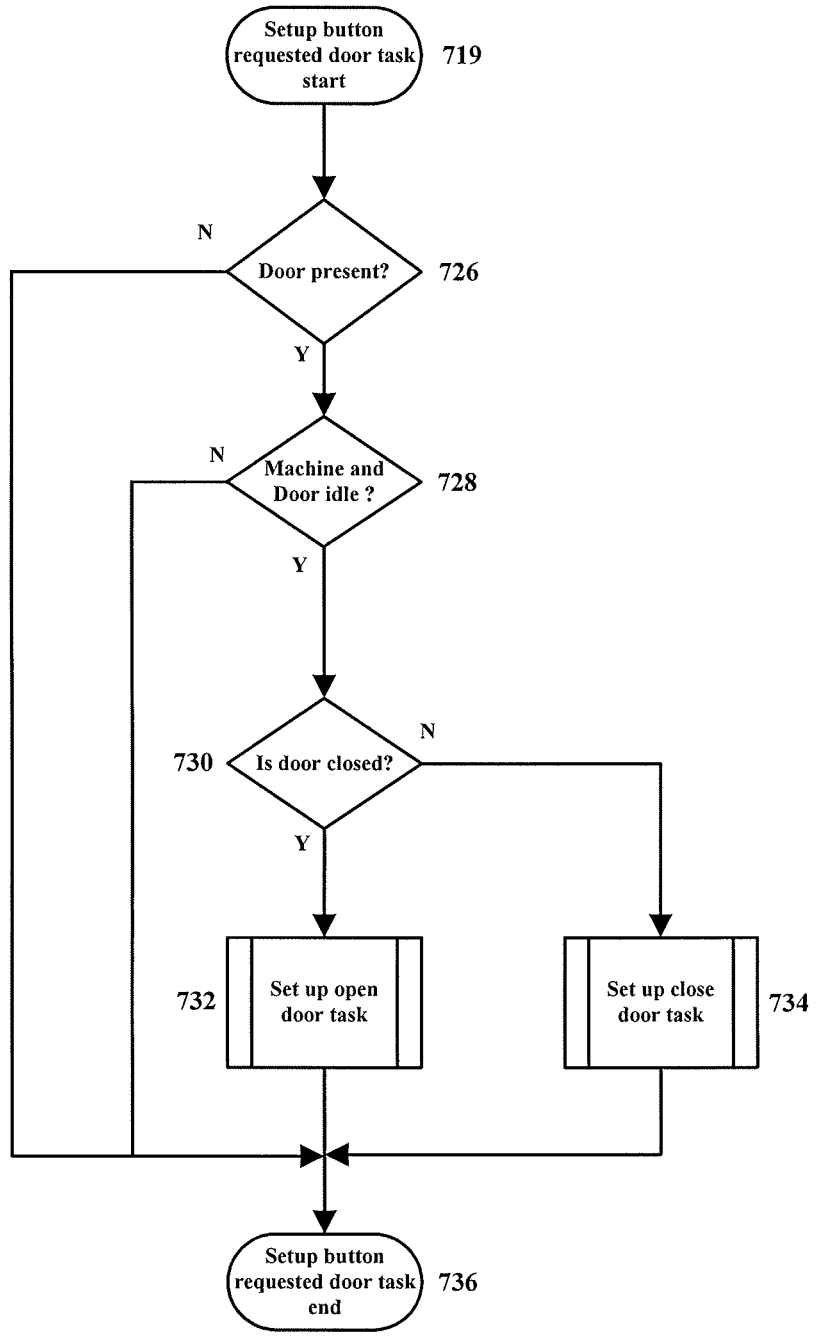
FIG. 7C is a flow diagram illustrating further aspects of the process in FIG. 7B.

FIG. 7C is a flow diagram illustrating details of the process represented by block 718 in FIG. 7B. At block 719, the program may begin a sequence to initiate whatever task was requested by a button press. When the button is pressed, the program may then determine, at decision block 726, whether a door is present. If not, then the setup of the requested door task may terminate at block 736. Otherwise, the program may proceed to determine, at decision block 728, whether the machine and door are in an idle state. If not, then the setup of the requested door task may terminate at block 736. Otherwise, the program may proceed to determine at decision block 730 whether or not the door is closed. If the door is closed, then the program may set up a task to open the door, at block 732, so that the process of opening the door, which will be described in further detail below with reference to FIG. 8B, may be accomplished. Conversely, if the door is not closed, then the program may set up a task to close the door, at block 734, so that the process of closing the door, which will be described in further detail below with reference to FIG. 8C, may be accomplished. Alternatively, this determination may be made based on whether or not the door is open. In any event, once the program is set up to either open or close the door, the process may return, at block 736, to continue on from block 718 in FIG. 7B.

Figure 7D:
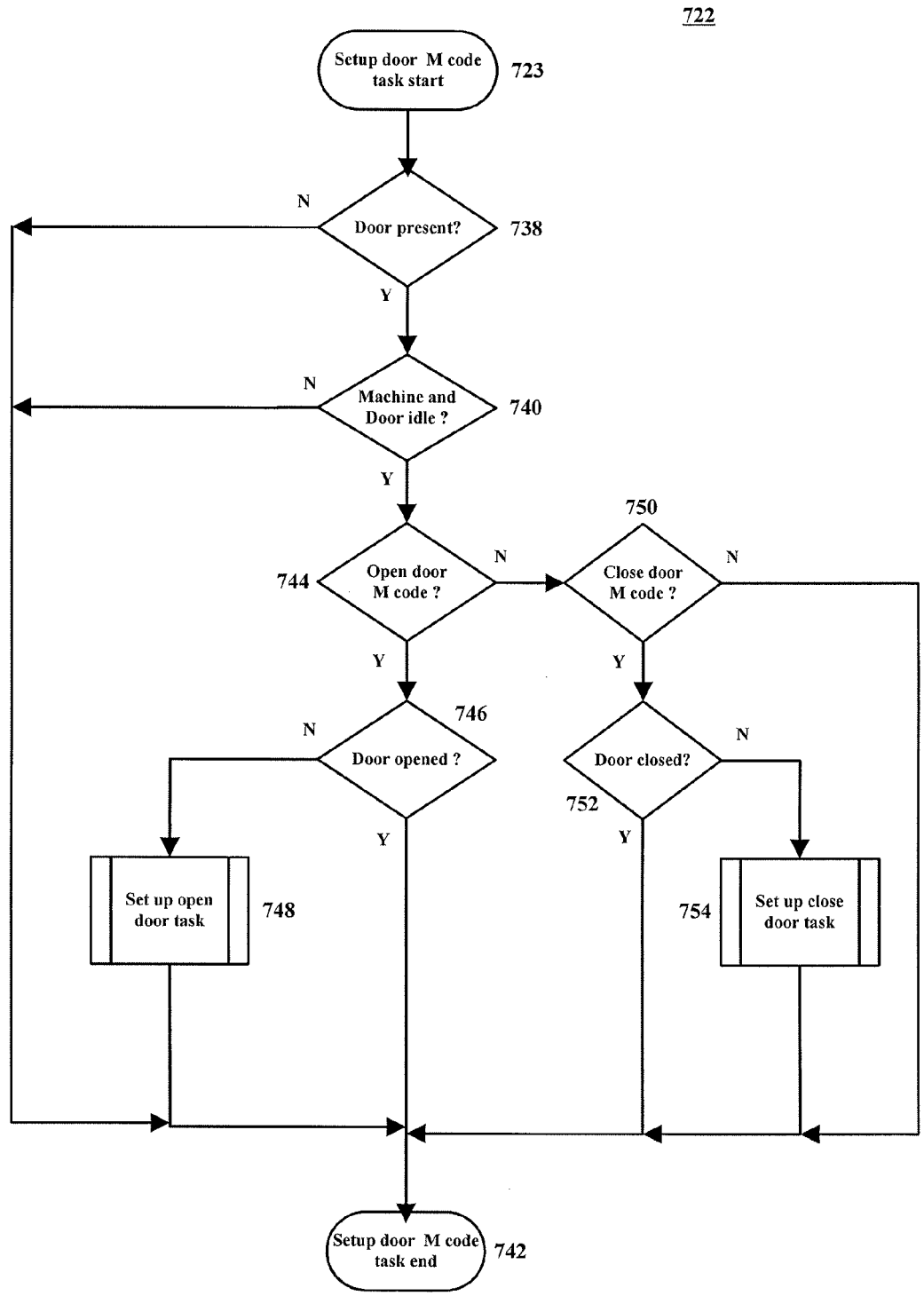
FIG. 7D is a flow diagram illustrating additional aspects of the process in FIG. 7B.

FIG. 7D is a flow diagram illustrating details of the process represented by block 722 in FIG. 7B. At block 723, the program may begin a sequence to initiate a requested door task. At decision block 738, the program may determine whether a door is present. If not, then the setup of the requested door task may terminate at block 742. Otherwise, the program may proceed to determine, at decision block 740, whether the machine and door are in an idle state. If not, then the setup of the requested door task may terminate at block 742. Otherwise, the program may proceed to determine, at decision block 744, whether the requested task was to open the door. If so, then at decision block 746 the program may determine whether the door is already open. If it is, then setup of the requested door task may terminate at block 742, because the door does not need to be opened. Otherwise, the task to open the door may be set up at block 748, so that the task of opening the door, described below with reference to FIG. 8B, may be accomplished. Afterwards, this part of the process may end at block 742 and return to continue on from block 722 in FIG. 7B. Returning to decision block 744, if the program determines the requested task is not to open the door, then it may determine at decision block 750 whether the requested task is to close the door. If so, then at decision block 752 the program may determine whether the door is already closed. If it is, then setup of the requested door task may terminate at block 742, because the door does not need to be closed. Otherwise, the task to close the door may be set up at block 754, so that the task of closing the door, which will be described in further detail below with reference to FIG. 8C, may be accomplished. Afterwards, this part of the process may end at block 742 and return to continue on from block 722 in FIG. 7B.

Figure 8A:
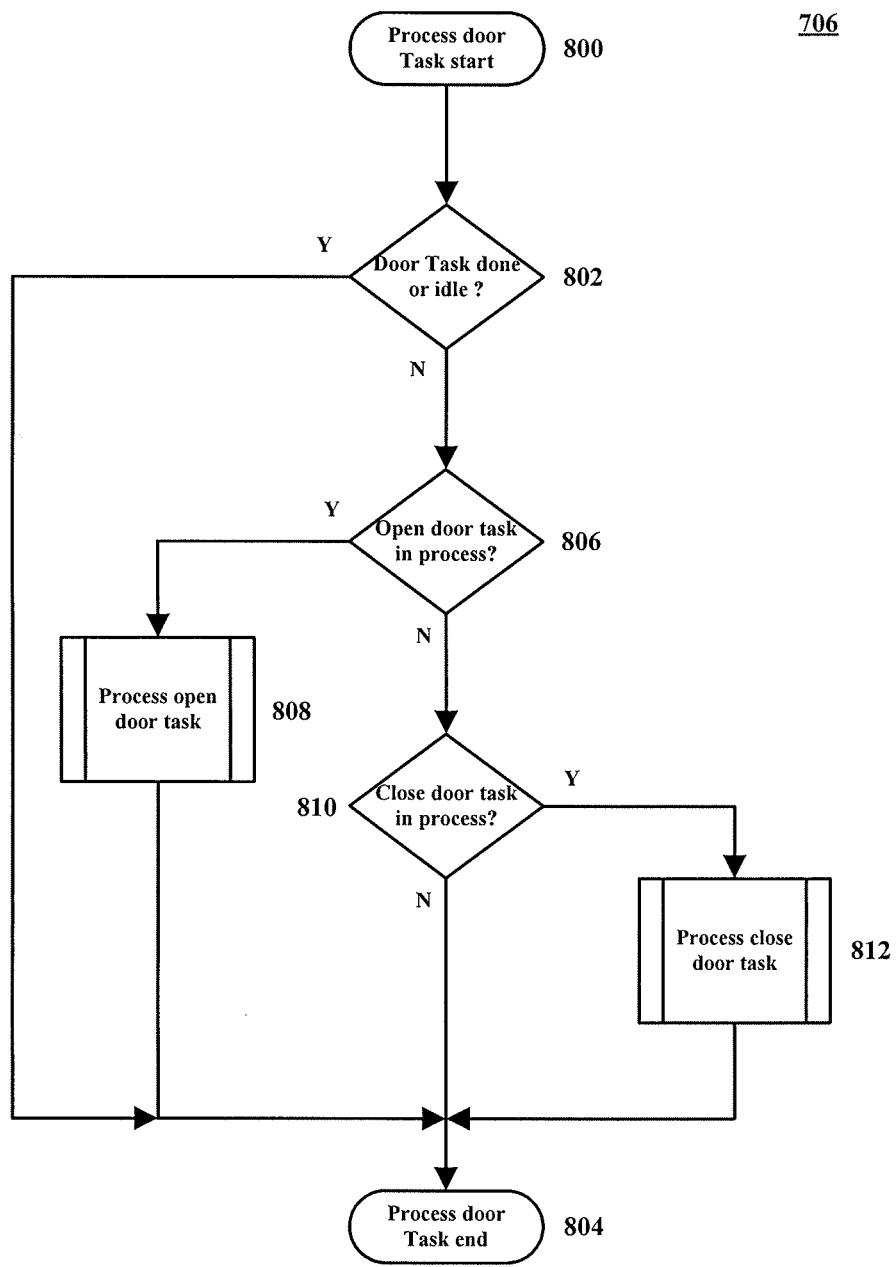
FIG. 8A is a flow diagram illustrating further aspects of the process in FIG. 7A.

FIG. 8A is a flow diagram illustrating the door task process 706 in FIG. 7A. This process may begin at block 800 with the program starting the process for a particular door task, such as opening or closing, for example. At decision block 802, the program may determine whether the door task has already been completed or whether it is idle. If the door task is already done or idle, then this portion of the program may terminate by ending the door task process at block 804. Otherwise, the program may determine at decision block 806 whether a task for opening the door is in process. If so, then the program may proceed with the process for opening the door, at block 808, described in further detail below with reference to FIG. 8B, before ending the door task process at block 804. Otherwise, if the open door task is not in process, the program may determine at decision block 810 whether a task for closing the door is in process. If so, then the program may proceed with the process for closing the door, at block 812, described in further detail below with reference to FIG. 8C, before ending the door task process at block 804. Otherwise, the program may proceed directly to ending the door task process at block 804, and continue on from block 706 in FIG. 7A.

Figure 8B:
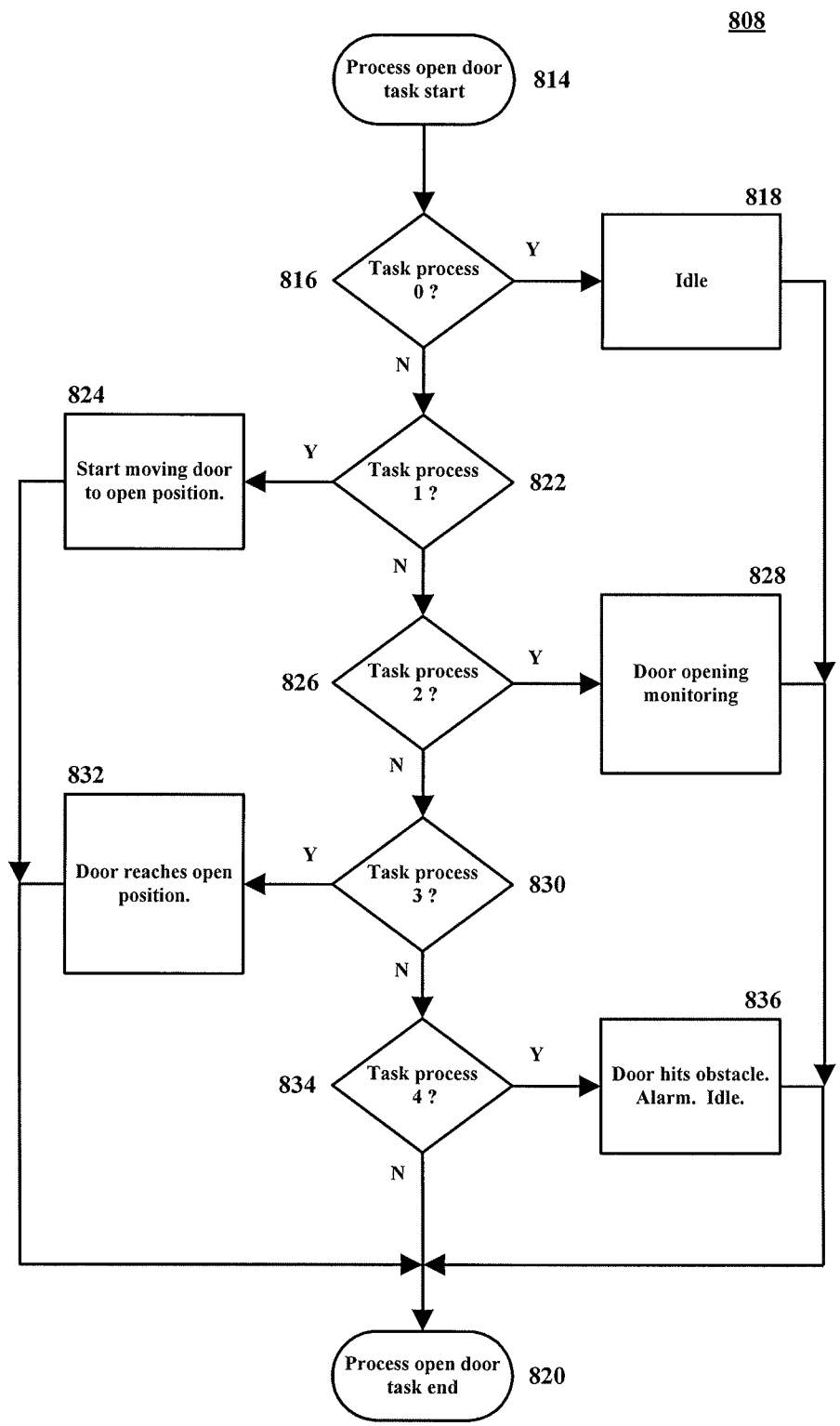
FIG. 8B is a flow diagram illustrating further aspects of the process in FIG. 8A.

FIG. 8B is a flow diagram illustrating a process for opening a door, shown at block 808 in FIG. 8A. The open door task process may begin at block 814. The program may be configured, as an example, such that the "open door" task has different numbered stages to indicate how much the "open door" task has progressed at a certain point. As the door is moving, for example from a closed position to a fully open position, the program may enter various stages. For example, at a first stage there may be an instruction to prepare for moving the door; at a second stage there may be an instruction to start moving the door; at a third stage there may be an instruction to monitor the door's position at multiple points during its movement; at a fourth stage the door may have reached its fully open position and at a fifth stage the door may, before ever reaching its fully open position, encounter an obstacle. The first through fifth stages need not occur in numerical sequence. For example, a door may encounter an obstacle, triggering the fifth stage of the open door task process, at block 836, before the door reaches its open position. In that case, the open door task process may enter the fifth stage before it enters the fourth stage, or instead of entering the fourth stage. The different stages of the open door task process refer to different actions that can be taken, not necessarily to a time-dependent sequence of events. The control system may operate to monitor where in the process, i.e. at which of these five stages, the door is at any given point during its movement. Based on frequent assessments of which stage the door is in, during its motion, the control system may direct and adjust movement of the door as necessary.

At decision block 816, the program may determine whether the task is in a first stage, which may be numbered "Task process 0," for example. Of course, those skilled in the art will recognize that the numbering or naming is not important, and that many solutions are possible for measuring the progress of the task. If it is determined that the task is in its first stage, then the program may idle and wait for a next task as indicated at block 818, and the process may, through block 820, continue on from block 808 in FIG. 8A. If it is determined that the task is not in a first stage, then the program may determine at decision block 822 whether the task is in a second stage, e.g. "Task process 1." If so, then the program may cause a control system to start the task, by starting to move the door to an open position as indicated at block 824. At block 824, after the door begins moving toward the open position, the program may wait for the next process and exit, through block 820, from block 808 in FIG. 8A. Otherwise, if it is determined the task is not in a second stage, the program may determine at decision block 826 whether the task is in a third stage, e.g. "Task process 2." If so, the program may cause the control system to monitor the door's current position, as indicated at block 828. The program may proceed to a next process if the door reaches an open position or hits an obstacle, which will be described in further detail below with reference to FIG. 10. Other aspects of monitoring the current door position will be described in further detail below with reference to FIG. 8D. The program may then return, through block 820, continue on from block 808 in FIG. 8A. Otherwise, the program may determine at decision block 830 whether the task is in a fourth stage, e.g. "Task process 3." If so, then at block 832 the program may cause the control system to stop the process and enter an idle state if the door reaches an open position, or advance to a process for handling an alarm, such as if the door encounters an obstacle, for example. The program may then return, through block 820, continue on from block 808 in FIG. 8A. Otherwise, the program may determine at decision block 834 whether the task is in a fifth stage, e.g. "Task process 4." If so, then at block 836 the program may determine that the door has encountered an obstacle, and may trigger an alarm. The program may also reset the process to idle at this point, and may return, through block 820, and continue on from block 808 in FIG. 8A.

Figure 8C:
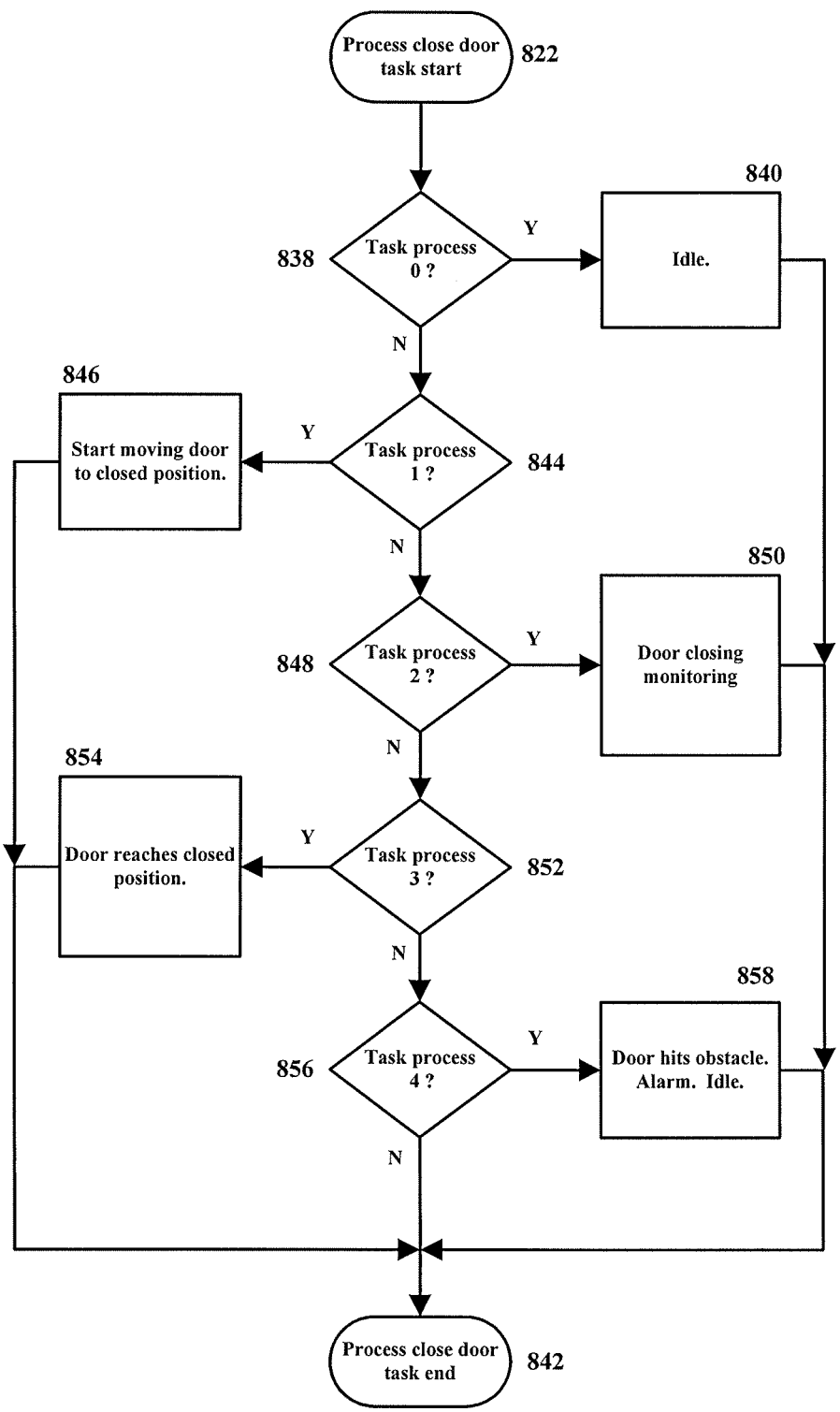
FIG. 8C is a flow diagram illustrating additional aspects of the process in FIG. 8A.

FIG. 8C is a flow diagram illustrating a process for closing a door, shown at block 812 in FIG. 8A, for example. At decision block 838, the program may determine whether the task is in a first stage, which may be numbered "Task process 0," for example. Of course, those skilled in the art will recognize that the numbering or naming is not important, and that many solutions are possible for measuring the progress of the task. If it is determined that the task is in its first stage, then the program may idle and wait for a next task as indicated at block 840, and the process for performing the close door task may return, through block 842, to continue on from block 812 in FIG. 8A. If it is determined that the task is not in a first stage, then the program may determine at decision block 844 whether the task is in a second stage, e.g. "Task process 1." If so, then the program may cause a control system to start the task, by starting to move the door to a closed position as indicated at block 846. At this point, the program may wait for a next process and return, through block 842, to continue on from block 812 in FIG. 8A. Otherwise, if it is determined the task is not in a second stage, the program may determine at decision block 848 whether the task is in a third stage, e.g. "Task process 2." If so, the program may cause the control system to monitor the door's current position, as indicated at block 850. The program may proceed to a next process if the door reaches an open position or hits an obstacle, which will be described in further detail below with reference to FIG. 9. Other aspects of monitoring the current door position will be described in further detail below with reference to FIG. 8D. The program may also return, through block 842, to continue on from block 812 in FIG. 8A, at this point. Otherwise, the program may determine at decision block 852 whether the task is in a fourth stage, e.g. "Task process 3." If so, then at block 854 the program may cause the control system to stop the process and enter an idle state if the door reaches an open position, or advance to a process for handling an alarm, such as if the door encounters an obstacle, for example. The program may then return, through block 842, to continue on from block 812 in FIG. 8A. Otherwise, the program may determine at decision block 856 whether the task is in a fifth stage, e.g. "Task process 4." If so, then at block 858 the program may determine that the door has encountered an obstacle, and may trigger an alarm. The program may also reset the process to idle, and may return, through block 842, to continue on from block 812 in FIG. 8A.

Figure 8D:
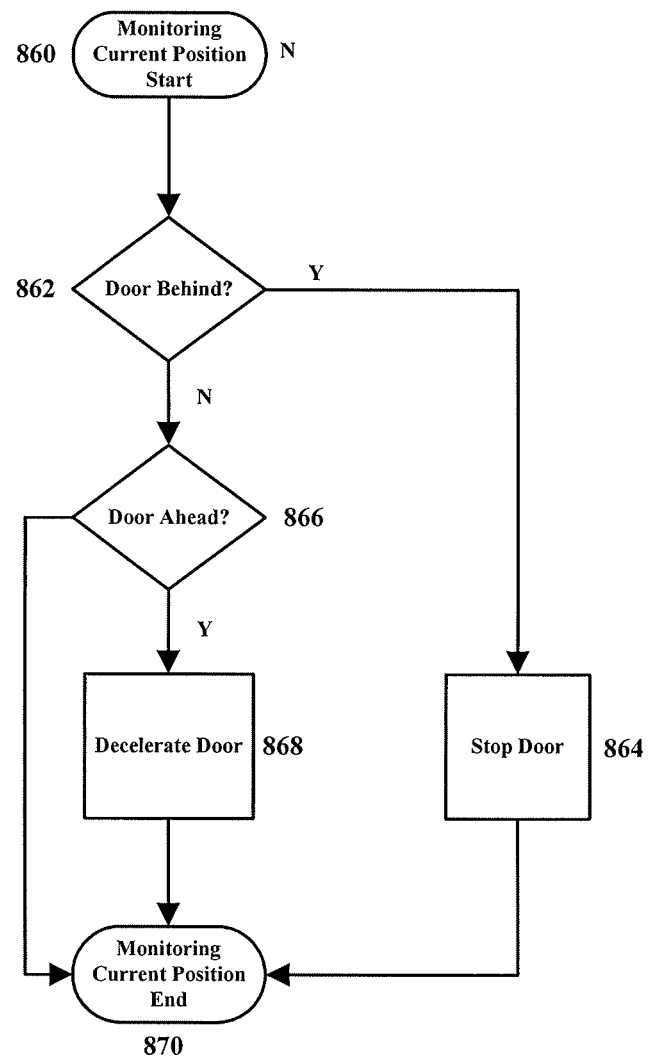
FIG. 8D is a flow diagram illustrating position monitoring aspects of the process in FIGS. 8B and 8C.

FIG. 8D is a flow diagram illustrating aspects of monitoring the current position of the door, such as at block 828 in FIG. 8B and block 850 in FIG. 8C. One aspect of monitoring the current position of the door, which may begin at block 860, may include assessing whether the door is ahead of or behind its expected current position, and adjusting the amount of force available to the door, and the motion of the door, accordingly. For example, at decision block 862 the control system may assess whether the current position of the door is behind its expected position. If so, then at block 864 the control system may stop the door (i.e. decelerate the door to a stop by controlling the motor driving the door), and remove all force available to the door, such as by stopping the motor. These actions may be taken, for example, because a door behind its current expected position could be blocked by an obstacle, such as a body part. To prevent injury, the control system may stop the door. Of course, those skilled in the art will recognize that further steps could be taken, after it is determined that the door is behind its expected position, to assess whether an obstacle exists and whether the door should be stopped. Such steps may be as described below with reference to FIG. 11, for example, and may assess how far behind target the door is. If it is determined at decision block 862 that the door is not behind target, then the program may assess whether the door is ahead of its expected position, at decision block 866. If so, then the control system may decelerate the door to get its position back on course. To decelerate the door, the control system may for example adjust appropriate parameters of the motor driving the door, and may increase the amount of force available to the door, or not reduce the amount of force available to the door, by not restricting the force output of the motor. Thus, the door may have the maximum amount of force available from the motor for its deceleration, in order that it may get back on track and return to its expected position. Again, those skilled in the art will recognize that further steps could be taken, after it is determined that the door is ahead of its expected position, to assess how far ahead of target the door's current position is detected, and whether the acceleration or force available to the door should be altered. Such steps may be as described below with reference to FIG. 11, for example, and may assess how far ahead of target the door is.

Figure 9:
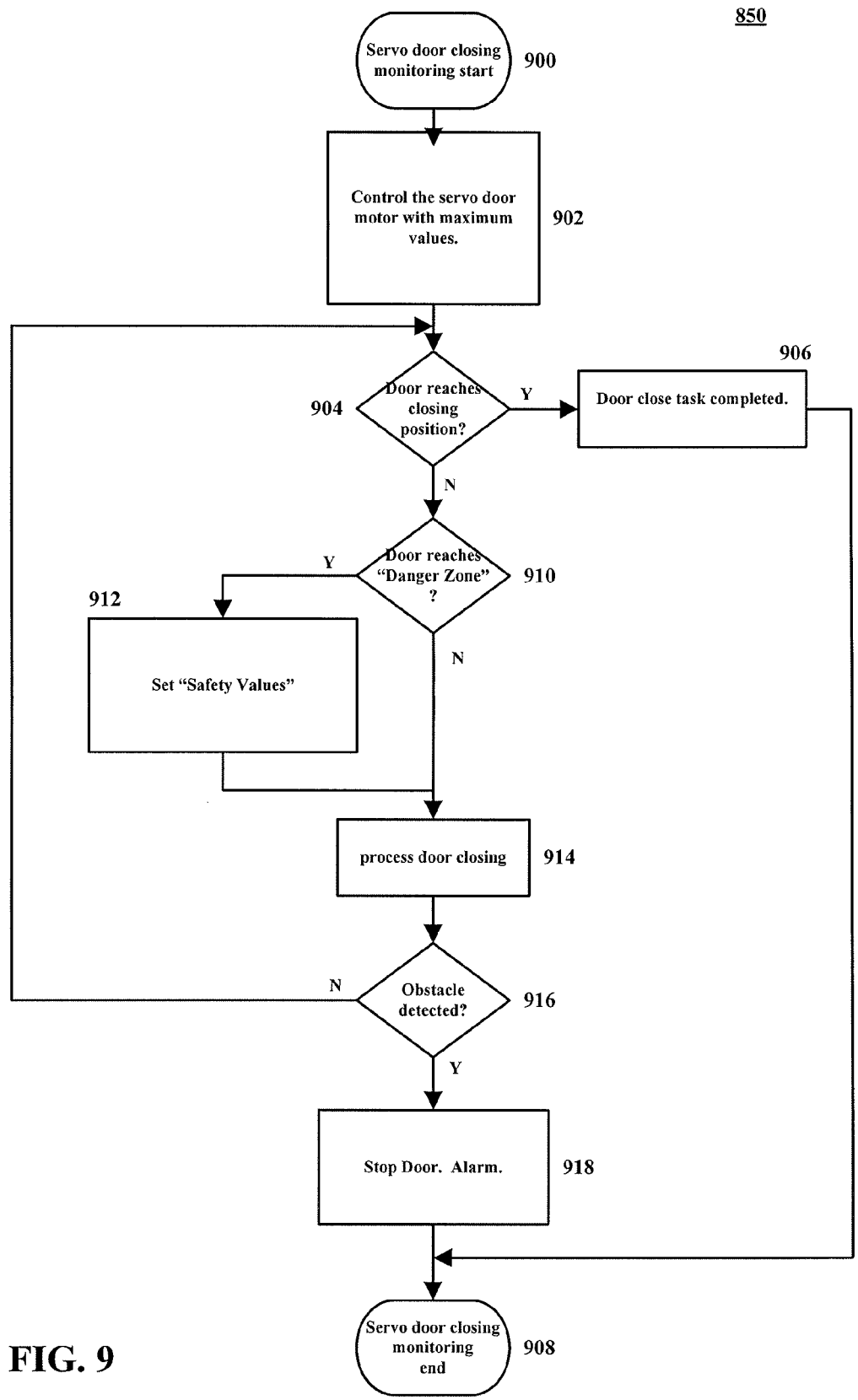
FIG. 9 is a flow diagram illustrating additional aspects of the process in FIG. 8C.

FIG. 9 is a flow diagram illustrating the process of block 850 in FIG. 8C. One aspect of the process may include regulating an amount of force that is available to the door for its motion, based on the direction that the door is moving. For example, if it is determined at decision block 810 in FIG. 8A that the door is moving in the closing direction, then the control system may monitor the position of the door as it closes, at block 850 in FIG. 8C, also illustrated in further detail in FIG. 9, and also regulate an amount of force that is available to the door for its motion, for example by controlling the servo door motor with maximum values, at block 902 in FIG. 9. Those skilled in the art will recognize that it is not necessary for the control system to monitor the current door position in order to regulate the amount of force available to the door based on its direction, and that such regulation, by setting parameters of the motor that drives the door, may be based on direction of the door alone. For example, the control system may increase motor parameters, thereby increasing the amount of force available to the door, when the door is moving in the opening direction, and may decrease motor parameters, thereby decreasing the amount of force available to the door, when the door is moving in the opening direction. However, it is also possible that, based on the detected current position of the door, the control system may set acceleration and regulate the amount of force available to the door based on the monitored current position of the door, for example by controlling the servo door motor with maximum values, as indicated at block 902 and described in further detail below.

At block 900, the program may cause a control system to begin monitoring and adjusting the operation of a motor to close the door. The control system may include, for example, PID control as described above. The PID control may be implemented, for example, in a servo motor. Servo monitoring may be used by the control system, for example, to make adjustments and control the motion of the door as its position changes over time. As indicated at block 902, the control system may control the servo motor driving the door. For example, as the door begins to close, the control system may use increased or maximum values for speed and torque. These parameters may include, for example, current, acceleration and maximum velocity parameters, for controlling the servo motor that drives the door. While the door is closing at these increased or maximum parameter values, the program may determine, at decision block 904, whether the door has reached its closed position. If so, then at block 906, the program may complete the close door task, and the monitoring may terminate at block 908 and return to continue on from block 850 in FIG. 8C.

Otherwise, if the door has not yet reached its closed position, the program may continue the monitoring process by determining, at decision block 910, whether the door has reached a so-called "danger zone," for example by crossing a threshold beyond which the door opening is narrow enough to constitute a safety risk. For example, the door opening, or distance between the current position of the door and the closed position of the door, may be smaller than a certain threshold amount and therefore may constitute a heightened risk that body parts could become trapped in the small opening. If the program determines, at decision block 910, that the door opening has reached this smaller, more dangerous width, i.e. the door is within the "danger zone," then the program may direct the control system, at block 912, to reset the motor with safer values for speed and torque parameters. For example, current, acceleration and maximum velocity parameters for the servo motor may be reduced, so that the door has less force available to it and moves more slowly when it is operating within the "danger zone." Alternatively, even when in the "danger zone," if the door is caused to decelerate, the motor parameters may be increased so that the door has increased, or the maximum, amount of force available to it for deceleration. Determining that the door is within the "danger zone" may include, for example, determining a distance between the detected current position of the door and the door's closed position, and calculating whether that distance (i.e. the current opening) is less than a threshold value, which may be preselected to define a "danger zone" according to the various factors discussed above. On the other hand, if it is determined at decision block 910 that the door is not within the "danger zone," then the parameters for the motor may remain unchanged.

In either event, at block 914 the program may cause the control system to process the door closing task, while detecting at decision block 916 whether an obstacle is detected in the pathway of the door. An obstacle may be detected, for example, by continually monitoring the current position of the door and comparing the current position to the expected position. Those skilled in the art will recognize this is a common functionality of servo motors and other PID control applications. Unlike typical servo motors, however, if the program detects that the door's current position is behind its expected position, it may direct the control system at block 918 to stop movement of the door. It may also generate an alarm and set the door process to idle. Where a typical servo motor may attempt to correct the error in door position by directing the motor to advance the door more quickly, according to the subject technology, when the program detects that the door's current position is behind its expected position, this may be an indication that the door has encountered an obstacle in its pathway. Obstacle detection will be described in further detail below, with reference to FIG. 11. For safety reasons, the program may respond to the possible detected obstacle by halting movement of the door, generating an alarm and setting the door process to idle, as explained above and indicated at block 918. At the end of this process, the monitoring of the servo door closing function may terminate at block 908.

Figure 10:
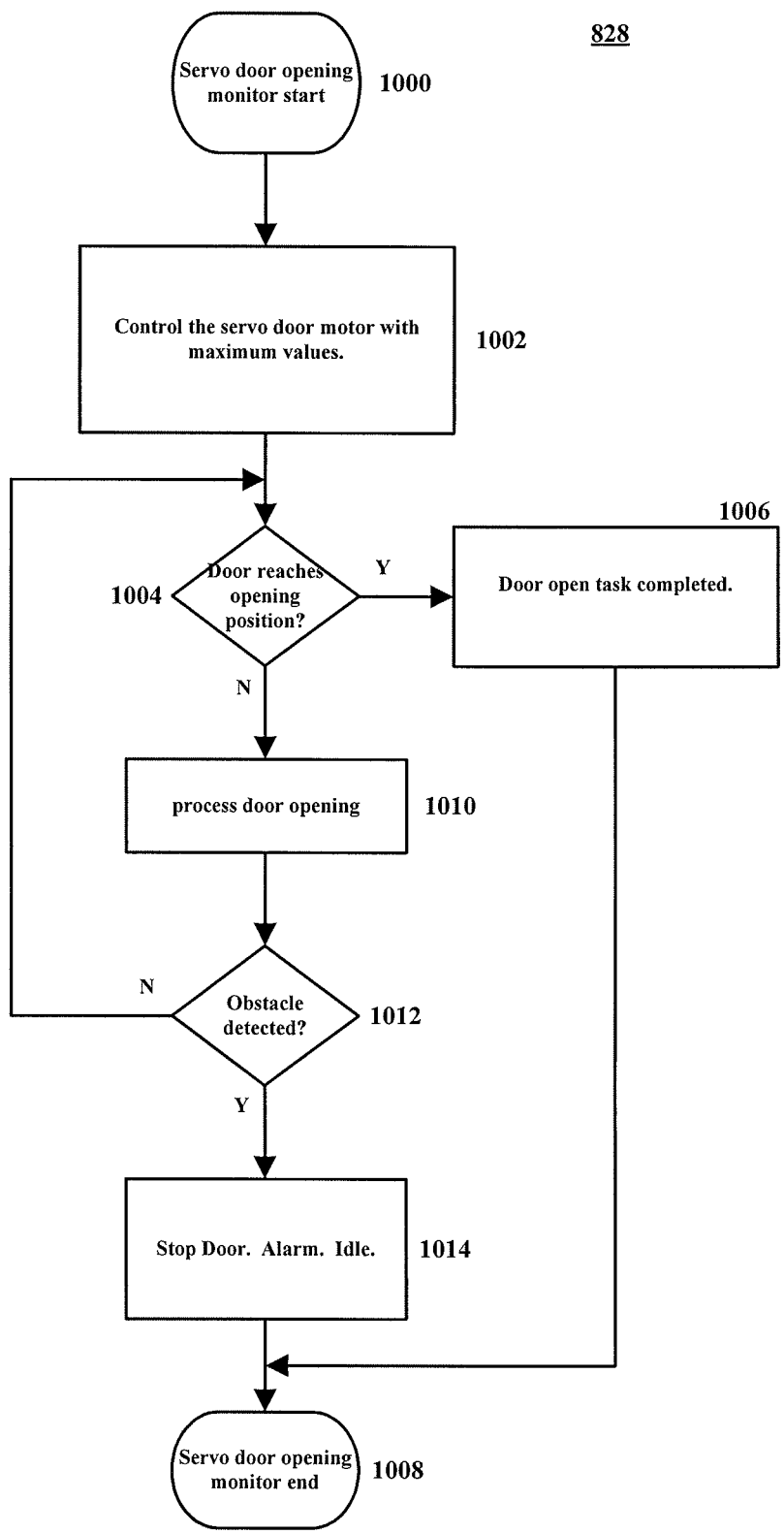
FIG. 10 is a flow diagram illustrating additional aspects of the process in FIG. 8B.

FIG. 10 is a flow diagram illustrating the process of block 828 in FIG. 8B. One aspect of the process may include regulating an amount of force that is available to the door for its motion, based on the direction that the door is moving. For example, if it is determined at decision block 810 in FIG. 8A that the door is moving in the opening direction, then the control system may monitor the position of the door as it opens, at block 828 in FIG. 8B, also illustrated in further detail in FIG. 10, and regulate an amount of force that is available to the door for its motion, for example by controlling the servo door motor with maximum values, at block 1002 in FIG. 10. Those skilled in the art will recognize that it is not necessary for the control system to monitor the current door position in order to regulate the amount of force available to the door based on its direction, and that such regulation, by setting parameters of the motor that drives the door, may be based on direction of the door alone. For example, the control system may increase motor parameters, thereby increasing the amount of force available to the door, when the door is moving in the opening direction, and may decrease motor parameters, thereby decreasing the amount of force available to the door, when the door is moving in the closing direction. However, it is also possible that, based on the detected current position of the door, the control system may set acceleration and regulate the amount of force available to the door based on the monitored current position of the door, for example by controlling the servo door motor with maximum values, as indicated at block 1002 and described in further detail below.

At block 1000, the program may cause a control system to begin monitoring the operation of a servo motor to open the door. Servo monitoring may be used by the control system, for example, to make adjustments and control the motion of the door as its position changes over time. As indicated at block 1002, the control system may control the servo motor as the door begins to open. For example, the control system may use increased or maximum values for speed and torque. These parameters may include, for example, current, acceleration and maximum velocity parameters, for controlling the servo motor that drives the door. While the door is opening at these increased or maximum parameter values, the program may determine, at decision block 1004, whether the door has reached its open position. If so, then at block 1006, the program may complete the open door task, and the monitoring may terminate at block 1008, with the process returning to block 828 in FIG. 8B. Otherwise, if the door has not yet reached its open position, the program may continue opening process at block 1010.

Unlike the closing process described above with reference to FIG. 9, the program may not include functionality for detecting and responding to the width of the opening with respect to a "danger zone," because while the door is opening safety may be a lesser concern than while the door is closing. For example, body parts are not as likely to become trapped in the door's pathway when the door is opening, as when the door is closing. The program may, however, test for obstacles when the door is opening, similar to the obstacle detection described above with reference to FIG. 9 for the door closing process. The program may determine, at decision block 1012, whether an obstacle is detected in the pathway of the door.

As explained above with reference to FIG. 9, an obstacle may be detected, for example, by continually monitoring the current position of the door and comparing the current position to the expected position. If the program detects that the door's current position is behind its expected position, it may detect an obstacle in the pathway of the door. Obstacle detection will be described in further detail below, with reference to FIG. 11. In the event an obstacle is detected at decision block 1012, the program may direct the control system at block 1014 to stop movement of the door. It may also generate an alarm and set the door process to idle. Then, the monitoring of the servo door opening function may terminate at block 1008.

Figure 11:
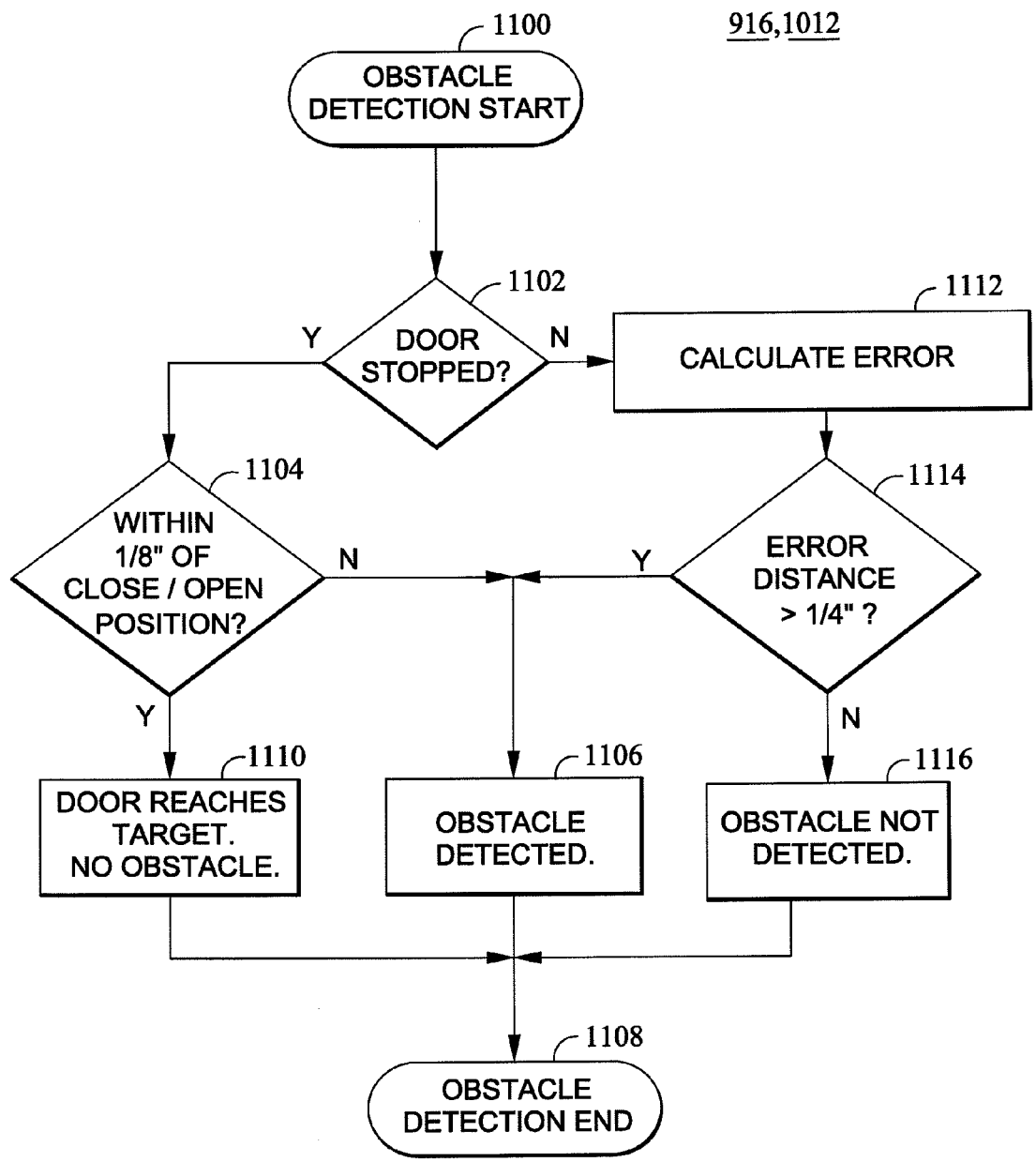
FIG. 11 is a flow diagram illustrating a process for detecting and responding to an obstacle.

FIG. 11 is a flow diagram illustrating a process for controlling a moving door when an obstacle is in a pathway of the door. The obstacle detection function may begin at block 1100. At decision block 1102, the program may determine whether a moving door has stopped. If so, then at decision block 1104 the program may determine whether the current position of the door is within a certain threshold amount of the closed or opened position of the door. This amount may be, for example, 1/8" but those skilled in the art will recognize other values are possible. The threshold value may be selected based on the application of the particular door, such that if the door has stopped within the threshold amount of its fully opened or closed position, the door may be considered "closed" or "opened" sufficiently that no further action need be taken. In that event, the program may determine at block 1110 that the door has stopped because it reached its targeted position (i.e. it is fully or nearly opened or closed) and not because it encountered an obstacle. The program may then indicate that the door open task or door close task is complete, and it may terminate the obstacle detection function at block 1108. If, on the other hand, the stopped door is not stopped within the threshold distance from the opened or closed position, the program may indicate at block 1106 that the door has stopped because an obstacle has been detected. At block 1108, the obstacle detection function may terminate and the program may then proceed to handle the detected obstacle condition.

Returning to decision block 1102, if the program determines that the door has not stopped, but in monitoring the door's current position as compared to its expected position calculates that the door's current position is not the same as its expected position, the program may indicate there is an error in the door's position at block 1112. The error may be calculated at block 1112, for example, by subtracting the current physical position of the door from the commanded or expected position of the door (according to the logic being implemented by the control system), to yield the difference, which is the current error. The program may then process the error to determine whether it is the result of an obstacle. For example, the program may determine at decision block 1114 whether the error is greater than some threshold amount. This amount may be set at ¼", For example, but those skilled in the art will recognize that many different values are possible. If the error is determined at decision block 1114 to be greater than the threshold value, then the program may indicate at block 1106 that the door has stopped because an obstacle has been detected. At block 1108, the obstacle detection function may terminate and the program may then proceed to handle the detected obstacle condition. Returning to decision block 1114, if the program determines that the error is not greater than the threshold value, then the program may determine at block 1116 that an obstacle has not been detected. The program may then indicate that the door open task or door close task is not complete, and it may terminate the obstacle detection function at block 1108 and return with its decision (obstacle or no obstacle) to continue on from decision block 916 or decision block 1012 in FIG. 9 or 10, respectively.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A method of controlling the motion of a moveable door, comprising:
   detecting a current position of a door;
   determining a direction that the door is moving with respect to a closed position of the door;
   determining a distance between the detected current position of the door and the closed position of the door if the direction that the door is moving is determined to be toward the closed position;
   decreasing a maximum amount of force that is available to the door for its motion if the distance between the detected current position and the closed position is less than a threshold value;
   determining whether the detected current position of the door is ahead of or behind an expected position of the door; and
   decreasing the maximum amount of force that is available to zero if the detected current position of the door is determined to be behind the expected position of the door and the distance between the detected current position and the closed position is less than the threshold value.

2. The method of claim 1, wherein if the direction is determined to be toward the closed position of the door, the method further comprises:
   based on the detected current position, setting an acceleration for the motion of the door; and
   based on the detected current position, regulating the amount of force that is available to the door for its motion at the set acceleration.

3. The method of claim 2, wherein setting the acceleration and regulating the amount of force comprises:
   setting the acceleration according to the determined distance between the detected current position of the door and the closed position of the door and the determination of whether the detected current position is ahead of or behind the expected current position of the door; and
   regulating the amount of available force according to the determination of whether the detected current position is ahead of or behind the expected current position of the door.

4. The method of claim 3, wherein if the detected current position is determined to be ahead of the expected current position, the method further comprises setting the acceleration to be a negative value and increasing the amount of available force.

5. The method of claim 3, wherein if the detected current position is determined to be behind the expected current position, the method further comprises setting the acceleration to be zero and eliminating the available force.

6. The method of claim 1, wherein if the direction is determined to be away from the expected closed position of the door, the amount of force available to the door is not limited.

7. The method of claim 1, wherein regulating the amount of force comprises adjusting the amount of force generated by a force generating element that drives the door's movement.

8. The method of claim 7, wherein when the difference between the detected current position and the closed position is determined to be less than the threshold value, adjusting the amount of force comprises sending a command to the force generating element to limit the amount of force generated by the force generating element.

9. The method of claim 7, wherein when the difference between the detected current position and the closed position is detected to be greater than the threshold value, adjusting the amount of force comprises sending a command to the force generating element to increase the amount of force generated by the force generating element.

10. An automatic door with position-dependent torque limiting, comprising:
a door configured to have a fully opened position and a closed position;
a force generating element connected to the door such that force generated by the force generating element is applied to the door to move the door toward its fully opened position or closed position;
a position sensing device configured to detect a current position of the door, and further configured to generate an output based on the detected current position of the door; and
a control system operatively connected to the force generating element and configured to set acceleration of the door based upon the output from the position sensing device, and further configured to regulate the amount of force generated by the force generating element based upon the generated output from the position sensing device,
wherein the control system is further configured to:
determine a distance between the detected current position of the door and the closed position of the door;
determine whether the detected current position is ahead of or behind the expected current position of the door;
set the acceleration according to the determined distance and the determination of whether the detected current position is ahead of or behind the expected current position of the door; and
regulate a maximum amount of force that is available to move the door according to the determination of whether the detected current position is ahead of or behind the expected current position of the door.

11. The automatic door of claim 10, wherein the control system is further configured to set the acceleration to a negative acceleration and increase the amount of available force if the detected position is determined to be ahead of the expected current position.

12. The automatic door of claim 10, wherein the control system is further configured to set the acceleration to zero and eliminate the amount of available force if the detected current position is determined to be behind the expected current position.

13. The automatic door of claim 10, wherein the force generating element comprises a servo motor.

14. A control system for controlling the motion of a moveable door, comprising:
a direction detector configured to detect a direction of a door;
a position detector configured to detect a current position of the door; and
a control unit configured to operate a force generating element based on signals from the direction and position detectors, wherein the control unit is further configured to:
receive a signal from the direction detector indicating which direction the door is moving with respect to a closed position of the door; and
determine a distance between the detected current position of the door and the closed position of the door if the direction that the door is moving is detected to be toward the closed position;
decrease a maximum amount of force that is available to the door for its motion if the distance between the detected current position and the closed position is determined to be less than a threshold value;
determine whether the detected current position of the door is ahead of or behind an expected position of the door; and
decrease the maximum amount of force that is available to zero if the detected current position of the door is determined to be behind the expected position of the door.

15. The control system of claim 14, wherein if the direction is detected to be toward the closed position of the door, the control unit is further configured to:
receive a signal from the direction detector indicating the detected current position of the door;
based on the detected current position, set an acceleration for the door; and
based on the detected current position, regulate the amount of force that is available to the door for its motion at the set acceleration.

16. The control system of claim 14, wherein the control unit is further configured to:
if the distance between the detected current position of the door and the closed position is less than the threshold value, set the acceleration and regulate the amount of force.

17. The control system of claim 16, wherein the control unit is further configured to:
set the acceleration according to the distance and the determination of whether the detected current position is ahead of or behind the expected current position of the door; and
regulate the amount of available force according to the determination of whether the detected current position is ahead of or behind the expected current position of the door.

18. The control system of claim 17, wherein if the detected current position is determined to be ahead of the expected current position, the control unit is further configured to set the acceleration to be a negative value and increase the amount of available force.

19. The control system of claim 17, wherein if the detected current position is determined to be behind the expected current position, the control unit is further configured to set the acceleration to be zero and eliminate the available force.

20. The control system of claim 14, wherein, to regulate the amount of force, the control unit is configured to adjust the amount of force generated by a force generating element that drives the door's movement.

21. The control system of claim 20, wherein when a difference between the detected current position and the closed position is less than a threshold value, the control unit is configured to adjust the amount of force by sending a command to the force generating element to limit the amount of force generated by the force generating element.

22. The control system of claim 20, wherein when a difference between the detected current position and the closed position is greater than a threshold value, the control unit is further configured to adjust the amount of force by sending a command to the force generating element to increase the amount of force generated by the force generating element.

23. A computer-readable medium containing computer-executable instructions for performing a method of controlling the motion of a moveable door, the method comprising:
    detecting a current position of the door;
    determining a direction that the door is moving with respect to a closed position of the door;
    determining a distance between the detected current position of the door if the direction that the door is moving is determined to be toward the closed position;
    decreasing a maximum amount of force that is available to the door for its motion if a the distance between the detected current position and the closed position is determined to be less than the threshold value;
    determining whether the detected current position of the door is ahead of or behind and expected position of the door; and
    decreasing the maximum amount of force that is available to zero if the detected current position of the door is determined to be behind the expected position of the door.

24. The computer-readable medium of claim 23, wherein if the direction is determined to be toward the closed position of the door, the method further comprises:
    based on the detected current position, setting an acceleration for the motion of the door; and
    based on the detected current position, regulating the amount of force that is available to the door for its motion at the set acceleration.

25. The computer-readable medium of claim 24, wherein setting the acceleration and regulating the amount of force based on the detected position comprises:
    if the determined distance is less than the threshold value, setting the acceleration and regulating the amount of force.

26. The computer-readable medium of claim 25, wherein setting the acceleration and regulating the amount of force comprises:
    setting the acceleration according to the calculated distance and the determination of whether the detected current position is ahead of or behind the expected current position of the door; and
    regulating the amount of available force according to the determination of whether the detected current position is ahead of or behind the expected current position of the door.

27. The computer-readable medium of claim 26, wherein if the detected current position is determined to be ahead of the expected current position, the method further comprises setting the acceleration to be a negative value and increasing the amount of available force.

28. The computer-readable medium of claim 26, wherein if the detected current position is determined to be behind the expected current position, the method further comprises setting the acceleration to be zero and eliminating the available force.

29. The computer-readable medium of claim 23, wherein if the direction is determined to be away from the expected closed position of the door, the amount of force available to the door is not limited.

30. The computer-readable medium of claim 23, wherein regulating the amount of force comprises adjusting the amount of force generated by a force generating element that drives the door's movement.

31. The computer-readable medium of claim 30, wherein when a difference between the detected current position and the closed position is determined to be less than a threshold value, adjusting the amount of force comprises sending a command to the force generating element to limit the amount of force generated by the force generating element.

32. The computer-readable medium of claim 30, wherein when a difference between the detected current position and the closed position is detected to be greater than a threshold value, adjusting the amount of force comprises sending a command to the force generating element to increase the amount of force generated by the force generating element.

* * * * *